United States Patent
Ahn

(10) Patent No.: US 10,296,147 B2
(45) Date of Patent: May 21, 2019

(54) TOUCH SCREEN AND DISPLAY DEVICE INCLUDING THE SAME

(71) Applicant: Samsung Display Co., Ltd., Yongin-si (KR)

(72) Inventor: Soonsung Ahn, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 148 days.

(21) Appl. No.: 15/008,918

(22) Filed: Jan. 28, 2016

(65) Prior Publication Data

US 2016/0224156 A1    Aug. 4, 2016

(30) Foreign Application Priority Data

Feb. 2, 2015   (KR) .................. 10-2015-0016250
Aug. 11, 2015  (KR) .................. 10-2015-0113450

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ............................... G06F 3/044; G06F 3/0412
See application file for complete search history.

(56) References Cited

U.S. PATENT DOCUMENTS

| | | | |
|---|---|---|---|
| 7,663,607 B2 | 2/2010 | Hotelling et al. | |
| 8,077,161 B2 | 12/2011 | Kinoshita et al. | |
| 8,274,488 B2 | 9/2012 | Bae | |
| 8,648,819 B2 | 2/2014 | Philipp | |
| 2001/0214247 | 8/2010 | Tang et al. | |
| 2011/0025639 A1 | 2/2011 | Trend et al. | |
| 2011/0048813 A1 | 3/2011 | Yilmaz | |
| 2011/0279397 A1 | 11/2011 | Rimon et al. | |

(Continued)

FOREIGN PATENT DOCUMENTS

| | | |
|---|---|---|
| JP | 2007-299409 | 11/2007 |
| JP | 2009-122969 | 6/2009 |

(Continued)

OTHER PUBLICATIONS

European Extended Search Report dated Jun. 16, 2016, in European Patent Application No. 16153583.6.

*Primary Examiner* — Premal R Patel
(74) *Attorney, Agent, or Firm* — H.C. Park & Associates, PLC

(57) ABSTRACT

A display device includes a display panel configured to generate an image and a touch screen disposed on the display panel. The touch screen includes sensor blocks. Each of the sensor blocks includes: k (k being a natural number of two or more) first sensors disposed in a first direction and electrically connected to each other; and j (j being a natural number of two or more) sensor groups disposed adjacent to a corresponding first sensor among the k first sensors. Each of the j sensor groups includes i (i being a natural number of two or more) second sensors arranged in a second direction intersecting the first direction. Some of the k first sensors and the i second sensors are configured to receive first signals. Some of the k first sensors and the i second sensors are configured to transmit second signals different from the first signals.

27 Claims, 33 Drawing Sheets

(56) References Cited

U.S. PATENT DOCUMENTS

| | | | |
|---|---|---|---|
| 2013/0181942 A1* | 7/2013 | Bulea | G06F 3/044 |
| | | | 345/174 |
| 2014/0132860 A1 | 5/2014 | Hotelling et al. | |
| 2014/0176484 A1* | 6/2014 | Tsai | G06F 3/0412 |
| | | | 345/174 |
| 2014/0267128 A1* | 9/2014 | Bulea | G06F 3/044 |
| | | | 345/174 |
| 2014/0267137 A1* | 9/2014 | Solven | G06F 3/0416 |
| | | | 345/174 |
| 2015/0261348 A1 | 9/2015 | Jang et al. | |

FOREIGN PATENT DOCUMENTS

| | | |
|---|---|---|
| KR | 10-1233594 | 2/2013 |
| KR | 10-1444118 | 9/2014 |

* cited by examiner

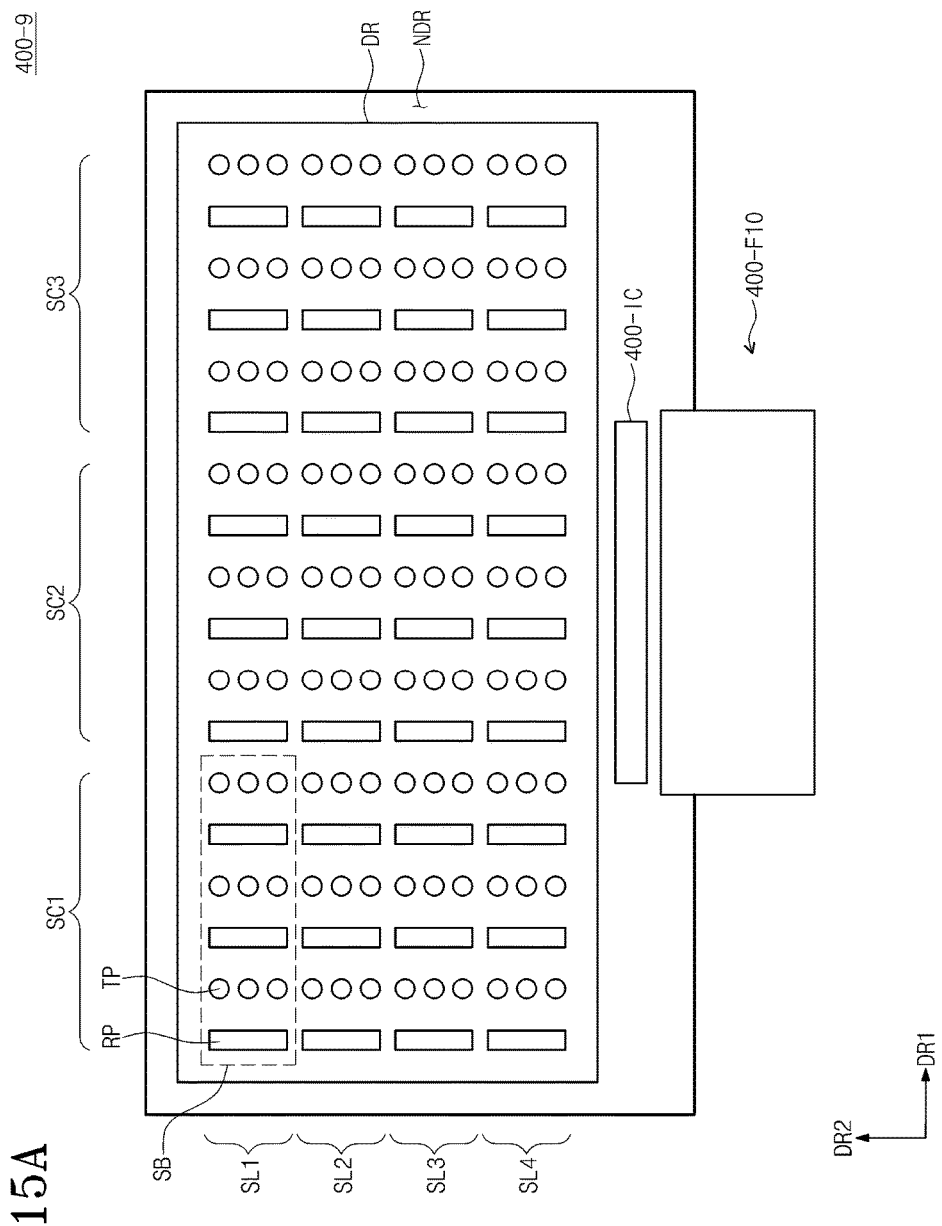

TOUCH SCREEN AND DISPLAY DEVICE INCLUDING THE SAME

CROSS-REFERENCE TO RELATED APPLICATIONS

This application claims priority from and the benefit of Korean Patent Application No. 10-2015-0016250, filed on Feb. 2, 2015, and Korean Patent Application No. 10-2015-0113450, filed on Aug. 11, 2015, each of which is hereby incorporated by reference for all purposes as if fully set forth herein.

BACKGROUND

Field

Exemplary embodiments relate to a touch screen and a display device including the same, and, more particularly, to a display device including a touch screen with a plurality of sensor blocks.

Discussion

Various display devices are used in association with multimedia devices, such as televisions, mobile phones, tablet computers, navigational equipment, game consoles, etc. These multimedia devices may include an input device to facilitate user interaction, such as keyboards, mice, etc. Additionally, display devices may include touch screens as input devices.

The above information disclosed in this Background section is only for enhancement of understanding of the background of the inventive concept, and, therefore, it may contain information that does not form the prior art that is already known in this country to a person of ordinary skill in the art.

SUMMARY

One or more exemplary embodiments provide a touch screen with a simple arrangement (e.g., reduced number) of signal lines and improved touch sensitivity.

One or more exemplary embodiments provide a display device including a touch screen with a simple arrangement (e.g., reduced number) of signal lines and improved touch sensitivity.

Additional aspects will be set forth in the detailed description which follows, and, in part, will be apparent from the disclosure, or may be learned by practice of the inventive concept.

According to one or more exemplary embodiments, a display device includes a display panel configured to generate an image and a touch screen disposed on the display panel. The touch screen includes sensor blocks. Each of the sensor blocks includes: k (k being a natural number of two or more) first sensors disposed in a first direction and electrically connected to each other; and j (j being a natural number of two or more) sensor groups disposed adjacent to a corresponding first sensor among the k first sensors. Each of the j sensor groups includes i (i being a natural number of two or more) second sensors arranged in a second direction intersecting the first direction. Some of the k first sensors and the i second sensors are configured to receive first signals. Some of the k first sensors and the i second sensors are configured to transmit second signals different from the first signals.

According to one or more exemplary embodiments, a display device includes a display panel configured to generate an image; and a touch screen disposed on the display panel. The touch screen includes sensor blocks. Each of the sensor blocks includes: k (k being a natural number of two or more) first sensors arranged in a first direction, a first part of the k first sensors being electrically connected to each other, a remaining a part of the k first sensors being electrically connected to each other and being electrically insulated from the first part of the k first sensors; and sensor groups disposed adjacent to a corresponding sensor among the k first sensors. Each of the sensor groups includes i (i being a natural number of two or more) second sensors arranged along a second direction intersecting the first direction. The k first sensors are configured to transmit first signals. The sensor groups are configured to receive second signals.

According to one or more exemplary embodiments, a touch screen includes sensor blocks. Each of the sensor blocks includes: k (k being a natural number of two or more) first sensors arranged in a first direction and electrically connected to each other; and j (j being a natural number of two or more) sensor groups disposed adjacent to a corresponding first sensor of the k first sensors. Each of the sensor groups includes i (i being a natural number of two or more) second sensors arranged along a second direction intersecting the first direction. Some of the k first sensors and the i second sensors are configured to receive first signals. Some of the k first sensors and the i second sensors are configured to transmit second signals.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 6A is a conceptual diagram of a first operating mode of a touch screen, according to one or more exemplary embodiments.

FIG. 6B is a conceptual diagram of a sensor row of a touch screen, according to one or more exemplary embodiments.

FIG. 6C is a conceptual diagram of a second operating mode of a touch screen, according to one or more exemplary embodiments.

FIGS. 7, 8, 9, 10, 11A, 11B, 12A, 12B, 13A, 13B, and 14 are conceptual diagrams of touch screen, according to one or more exemplary embodiments.

FIGS. 15A, 15B, 16A, and 16B are plan views of a touch screen, according to one or more exemplary embodiments.

DETAILED DESCRIPTION OF THE ILLUSTRATED EMBODIMENTS

Figure 1:
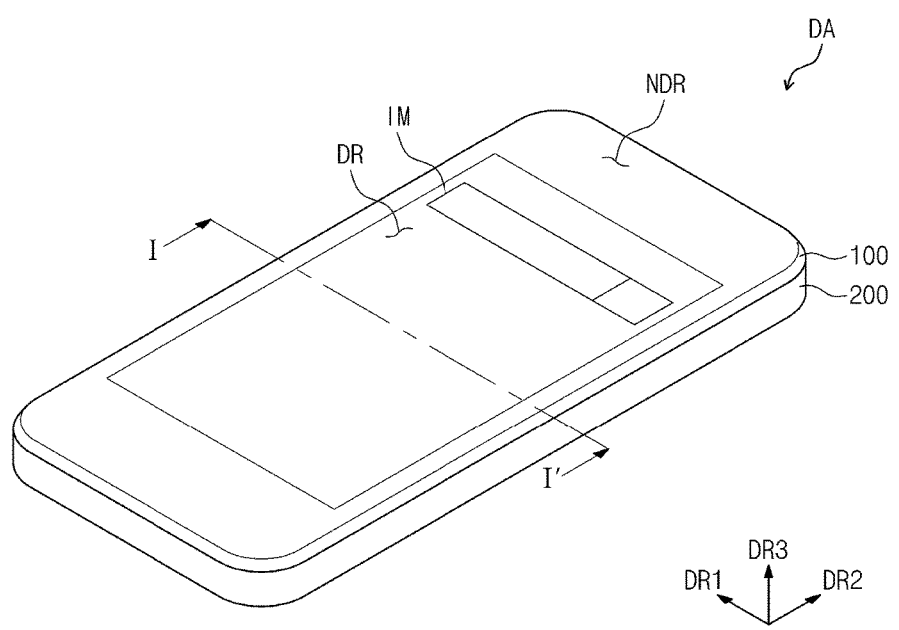
FIG. 1 is a perspective view of a display device, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
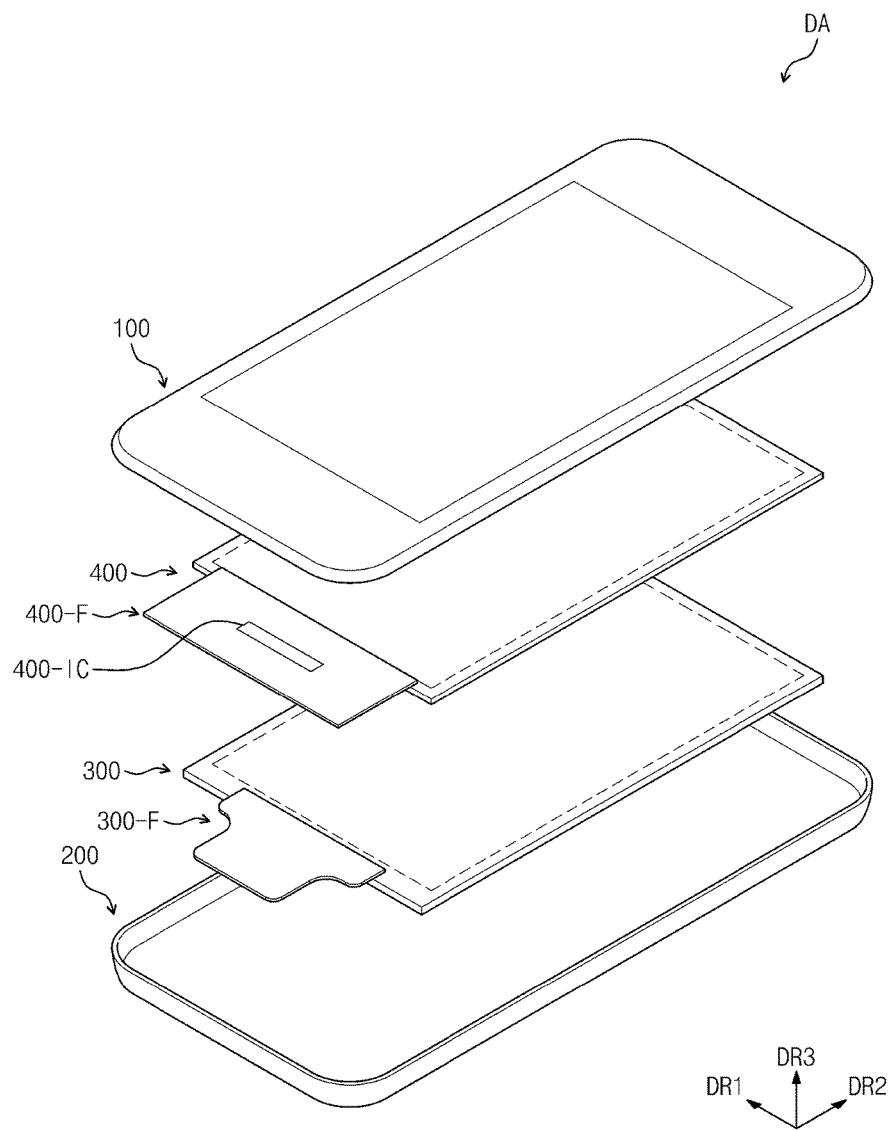
FIG. 2 is an exploded perspective view of a display device of FIG. 1, according to one or more exemplary embodiments.
Figure 3:
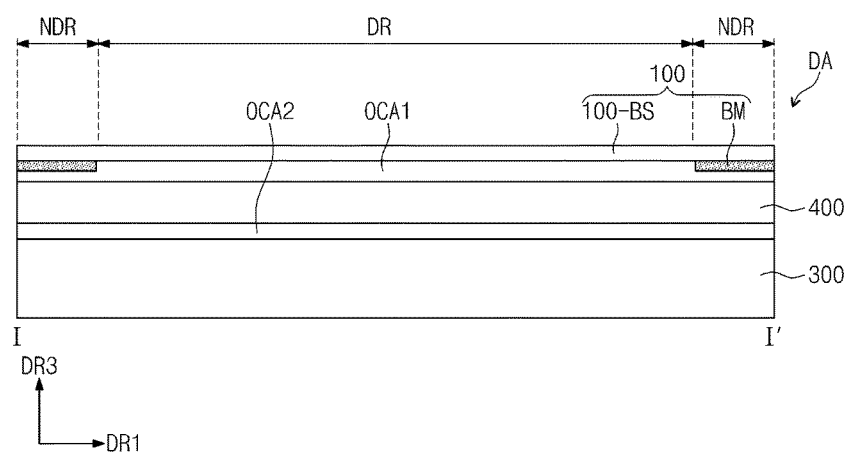
FIG. 3 is a sectional view of the display device of FIG. 1 taken along sectional line I-I', according to one or more exemplary embodiments.

FIG. 1 is a perspective view of a display device, according to one or more exemplary embodiments. FIG. 2 is an exploded perspective view of the display device of FIG. 1, according to one or more exemplary embodiments. FIG. 3 is a sectional view of the display device of FIG. 1 taken along sectional line I-I', according to one or more exemplary embodiments. As will become more apparent below, the protection frame 200 of the display device DA of FIG. 1 is not shown in FIG. 3.

A display surface where an image IM is displayed is parallel to a surface defined by a first direction axis DR1 and a second direction axis DR2. A third direction axis DR3 indicates the normal direction of the display surface. The third direction axis DR3 indicates the thickness direction of the display device DA. The front surface and the rear surface of each member of the display device DA are divided by (or otherwise spaced apart from one another in) the third direction axis DR3. It is noted, however, that the directions that the first, second, and third direction axes DR1, DR2, and DR3 indicate may be converted into other directions as a relative concept. Hereinafter, the first to third directions are defined as the illustrated first to third directions axes DR1, DR2, and DR3.

Although FIG. 1 illustrates a rigid flat display device DA, it is contemplated that exemplary embodiments are not limited thereto. For instance, the display device DA may be a curved display device with a determined curvature, a rollable display device, a foldable display device, a flexible display device, etc. Although not shown separately, the display device DA may be used in or in association with small and medium-sized electronic devices, such as mobile phones, personal computers, notebook computers, tablets, personal digital terminals, vehicle navigation units, game consoles, portable electronic devices, wristwatch-type electronic devices, refrigerators, washers, dryers, etc., in addition to large-sized electronic devices, such as televisions, monitors, outdoor sign boards, etc.

As shown in FIG. 1, the display device DA may include a plurality of regions divided on the display surface. For instance, the display device DA may include a display region DR where an image IM is displayed, and a non-display region NDR adjacent to the display region DR. FIG. 1 illustrates an internet search window as one example of the image IM, but exemplary embodiments are not limited thereto. As an example, the display area DR may have a rectangular form, but any other suitable geometric configuration may be utilized in association with exemplary embodiments described herein. The non display area NDA may surround the display area DA. According to one or more exemplary embodiments, the non-display area NDR may be disposed at only a horizontal side or only a vertical side of the display area DR.

As shown in FIGS. 2 and 3, the display device DA includes a window member 100, a protection frame 200, a display panel 300, and a touch screen 400. The display device DA includes a first flexible circuit board 300-F and a second flexible circuit board 400-F that are respectively connected to the display panel 300 and the touch screen 400. A driver integrated circuit (IC) 400-IC for driving the touch screen 400 may be mounted on the second flexible circuit board 400-F. Although not shown separately, a driver IC (not shown) for driving the display panel 300 may be mounted on the first flexible circuit board 300-F.

Each of the window member 100, the display panel 300, and the touch screen 400 may be divided by regions corresponding to the display area DR and the non-display region NDR of the display device DA on respective planes, e.g., respective planes defined with respect to the first and second direction axes DR1 and DR2. Although it is shown in FIG. 3 that widths according to the first direction axis DR1 of the window member 100, the display panel 300, and the touch screen 400 are the same, this is just one exemplary embodiment and the widths of the window member 100, the touch screen 300, and the touch screen 400 may vary.

The window member 100 includes a base member 100-BS and a black matrix BM. The black matrix BM is disposed at the rear surface of the base member 100-BS to define the non-display area NDR. The base member 100-BS may include any suitable material, such as, a glass substrate, a sapphire substrate, a plastic film, etc. The black matrix BM, for example, may be formed through a coating method as a colored organic layer. Although not shown separately, the window member 100 may further include a functional coating layer disposed at the front surface of the base member 100-BS. The functional coating layer may include at least one of a fingerprint prevention layer, a reflection prevention layer, and a hard coating layer.

The protection frame 200 is coupled with the window member 100 to receive the display panel 300 and the touch screen 400. The protection frame 200 may include one body that is assembled with a plurality of parts or molded through at least one of injection, compression, and extrusion. The body may also be formed via any other suitable manufacturing technique(s), e.g., casting, milling, etc. The protection frame 200 may include any suitable material, e.g., plastic, metal, composite, etc. It is also contemplated that the protection frame 200 may be omitted.

The display panel 300 generates an image IM corresponding to input data (e.g., input image data). The display panel 300 may be a liquid crystal display panel, an organic light emitting display panel, etc. For descriptive convenience, exemplary embodiments will be described with reference to an organic light emitting display panel implementation. A more detailed description for an organic light emitting display panel is provided later.

The touch screen 400 obtains coordinate information of an input point. The touch screen 400 may be, for example, a capacitive touch screen. A more detailed description of the touch screen 400 is described later.

The window member 100 and the touch screen 400 may be coupled with each other by an optically clear adhesive film OCA1. Additionally, the touch screen 400 and the display panel 300 may be coupled with each other by another optically clear adhesive film OCA2. According to exemplary embodiments, any one of the two optically clear adhesive films OCA1 and OCA2 may be omitted. For example, the touch screen 400 and the display panel 300 may be manufactured through a continuous processes, such that the touch screen 400 may be directly disposed on the display panel 300 without the presence of optically clear adhesive film OCA2.

Figure 4:
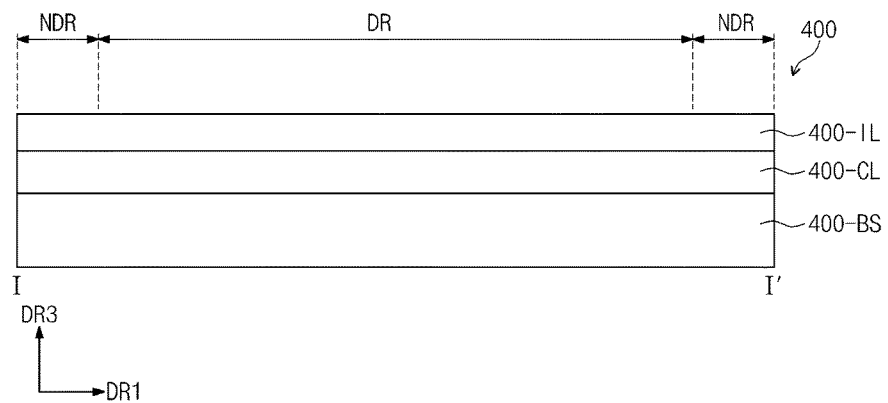
FIG. 4 is an enlarged sectional view of the touch screen of FIG. 3, according to one or more exemplary embodiments.
Figure 5A:
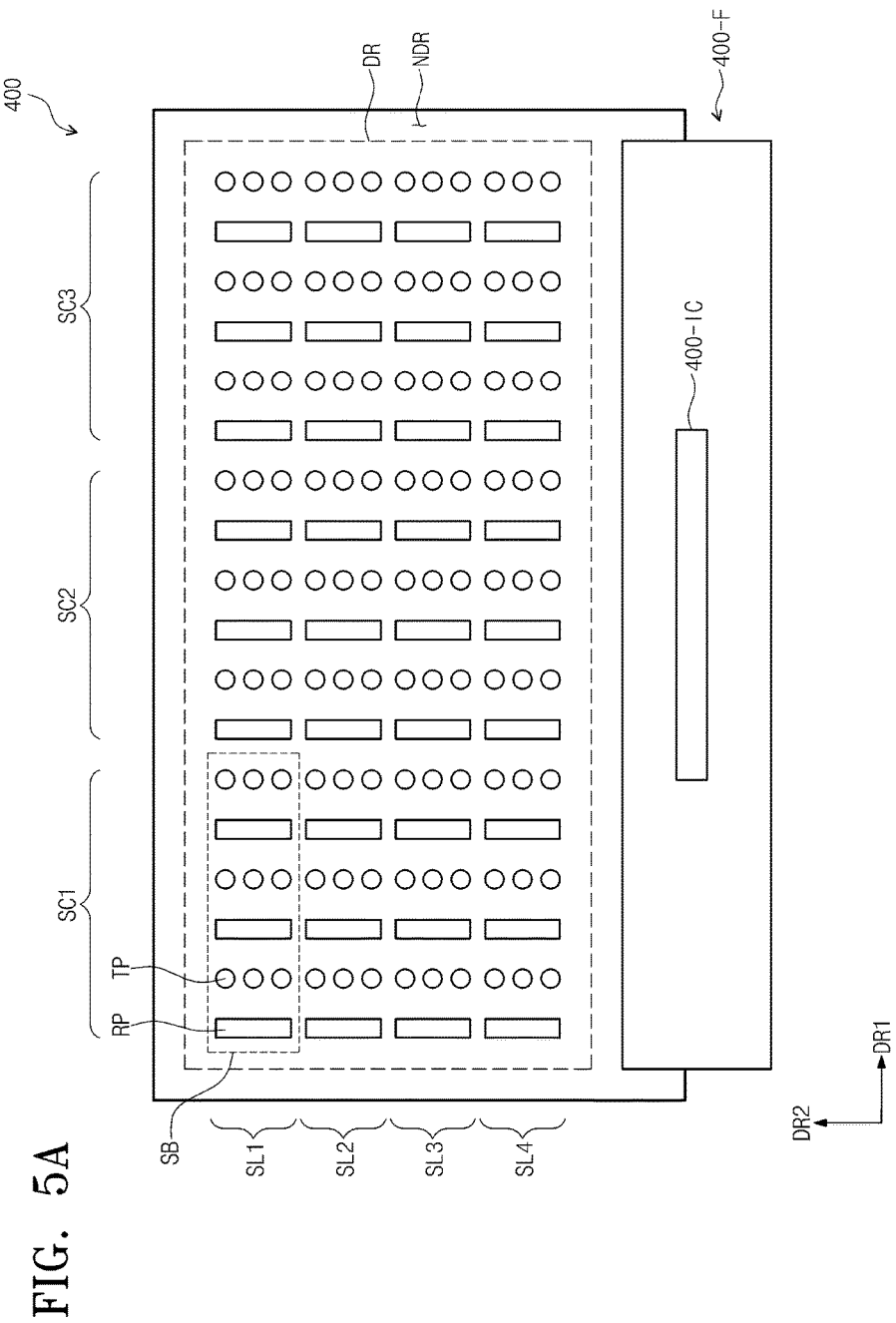
FIG. 5A is a plan view of the touch screen of FIG. 4, according to one or more exemplary embodiments.
Figure 5B:
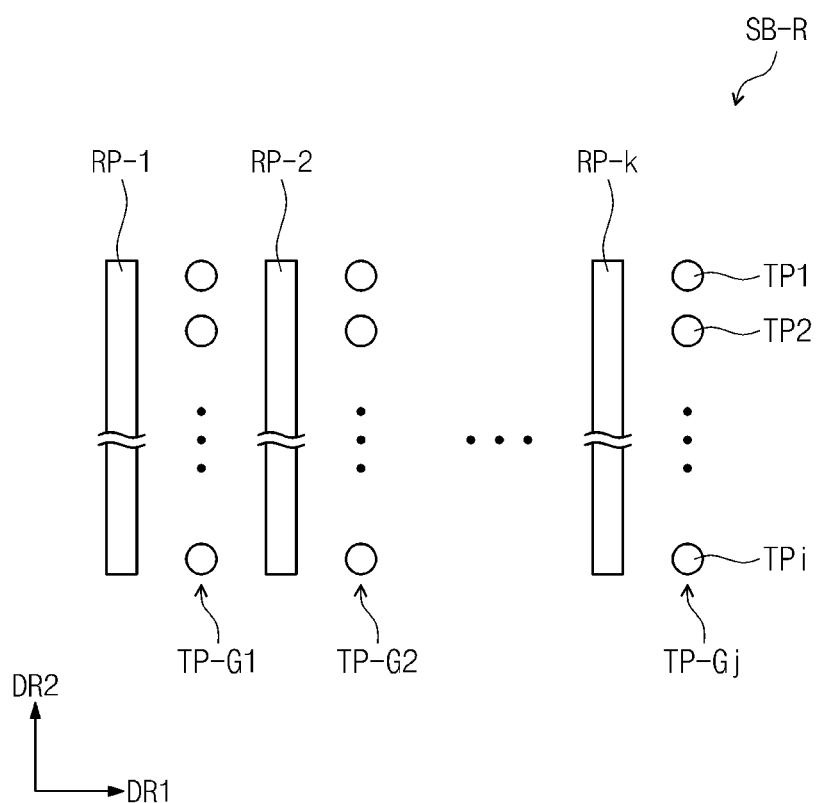
FIG. 5B is a plan view of a sensor block, according to one or more exemplary embodiments.
Figure 5C:
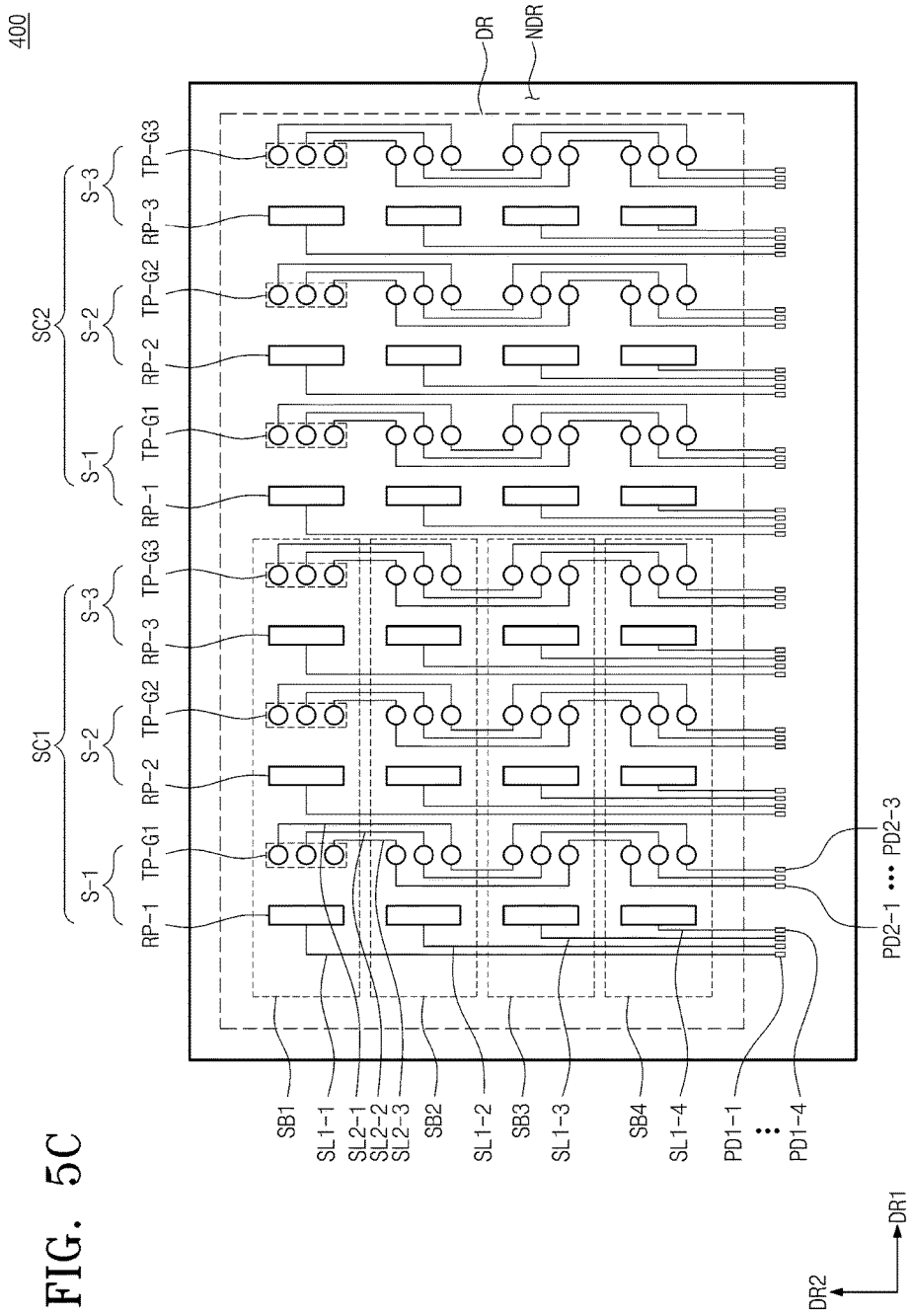
FIG. 5C is an enlarged plan view of sensor columns of the touch screen of FIG. 5A, according to one or more exemplary embodiments.
Figure 5D:
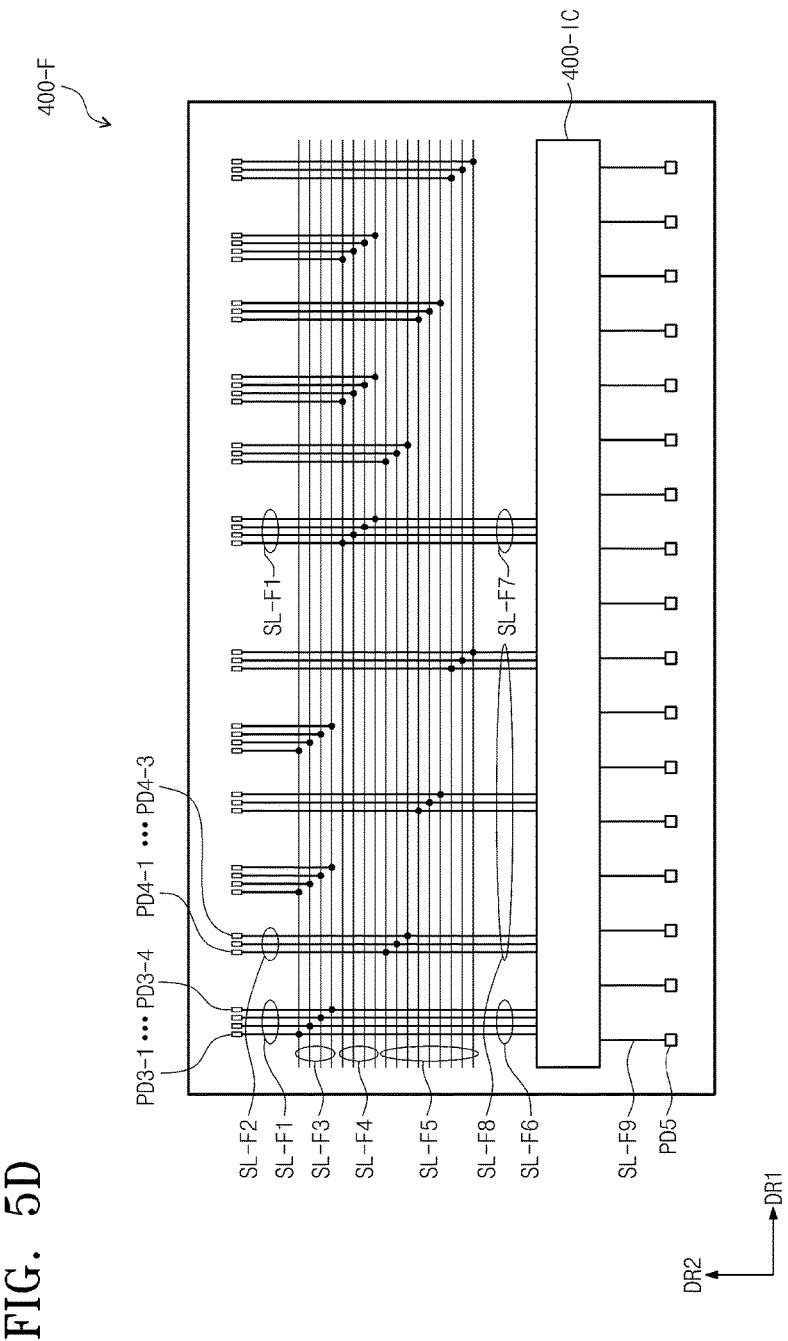
FIG. 5D is an enlarged plan view of a circuit board of the touch screen of FIG. 5A, according to one or more exemplary embodiments.
Figure 5E:
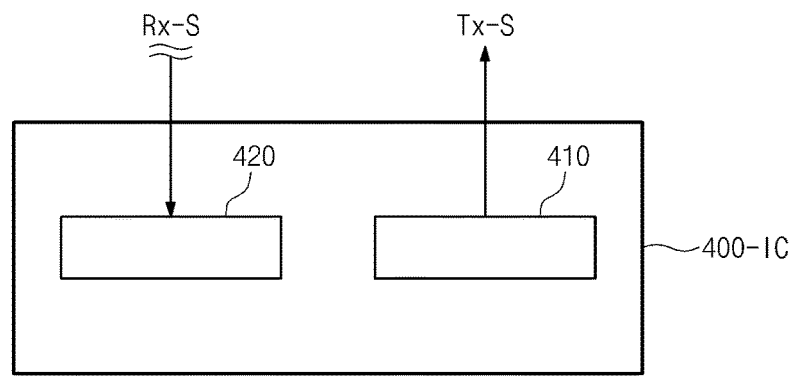
FIGS. 5E and 5F are block diagrams of a driving circuit of the touch screen of FIG. 5A, according to one or more exemplary embodiments.
Figure 5F:
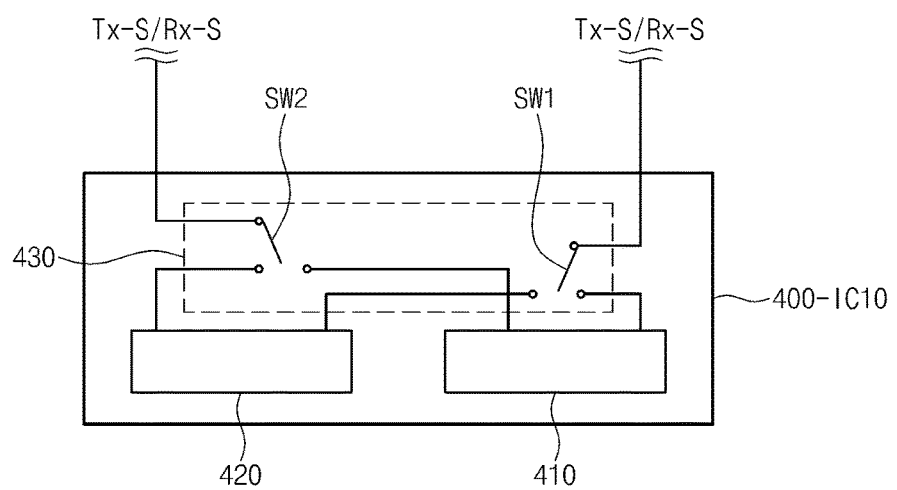

FIG. 4 is an enlarged sectional view of the touch screen of FIG. 3, according to one or more exemplary embodiments. In this manner, the viewpoint of FIG. 4 corresponds to the viewpoint associated with sectional line I-I' of FIG. 1. FIG. 5A is a plan view of the touch screen of FIG. 4, according to one or more exemplary embodiments. FIG. 5B is a plan view of a sensor block SB, according to one or more exemplary embodiments. FIG. 5C is an enlarged plan view of sensor columns SC1 and SC2 of the touch screen of FIG. 5A, according to one or more exemplary embodiments. FIG. 5D is an enlarged plan view of a circuit board 400-F of the touch screen of FIG. 5A, according to one or more exemplary embodiments. FIGS. 5E and 5F are block diagrams of a driving circuit 400-IC of the touch screen of FIG. 5A, according to one or more exemplary embodiments.

Referring to FIG. 4, the touch screen 400 includes a base member 400-BS, a conductive layer 400-CL, and an insulation layer 400-IL. As such, the touch screen 400 may be a single-layer capacitive touch screen; however, it is contemplated that any other suitable touch screen may be utilized in association with exemplary embodiments described herein. The single-layer capacitive touch screen may obtain the coordinate information of a touch point through a self-capacitance method or a mutual capacitance method. It is also noted that the touch screen 400 may be a multi-layer capacitive touch screen and may have a different layer structure according to regions DR and NDR.

The conductive layer 400-CL may include at least one transparent conductive layer or a metal layer. The transparent conductive layer may include indium tin oxide (ITO), indium zinc oxide (IZO), zinc oxide (ZnO), indium tin zinc oxide (ITZO), poly(3,4-ethylenedioxythiophene) (PEDOT), metal nano wire, and graphene. It is contemplated, however, that any other suitable material may be utilized in association with exemplary embodiments described herein. A metal layer may include molybdenum, silver, titanium, copper, aluminum, and an alloy thereof. According to one or more exemplary embodiments, the conductive layer 400-CL may include a plurality of transparent conductive layers or a plurality of conductive layers. The conductive layer 400-CL may include at least one transparent conductive layer and at least one conductive layer that are stacked on one another with respect to the third direction axis DR3. It is also contemplated that the conductive layer 400-CL may have a mesh structure. That is, a plurality of mesh holes MSH (not shown) may be defined in the conductive layer 400-CL to form a mesh structure.

The conductive layer 400-CL includes a plurality of conductive patterns disposed on a first surface of the base member 400-BS. As will become more apparent below, the plurality of conductive patterns configure touch sensors and signal lines of the touch screen 400. The insulating layer 400-IL may provide the plurality of conductive patterns or may insulate some conductive patterns among the plurality of conductive patterns from another some of the conductive patterns.

Referring to FIG. 5A, the touch screen 400 includes a plurality of sensor blocks SB. Each of the plurality of sensor blocks SB includes a plurality of first sensors RP and a plurality of second sensors TP. FIG. 5A exemplarily illustrates sensor blocks SB including three first sensors RP and nine second sensors TP; however, exemplary embodiments are not limited thereto. Three first sensors RP may be electrically connected to each other. Nine second sensors TP may be separated (that is, insulated) from each other electrically. The three second sensors TP may be disposed respectively at first (e.g., right) sides of the three first sensors RP. An arrangement relationship between the first sensors RP and the second sensors TP may vary.

A plurality of sensor blocks SB may be arranged in a matrix. A plurality of sensor blocks SB arranged in a matrix may include a plurality of sensor columns, e.g., sensor columns SC1 to SC3, and a plurality of sensor rows, e.g., sensor rows SL1 to SL4. FIG. 5A exemplarily illustrates the touch screen 400 including three sensor columns SC1 to SC3 and four sensor rows SL1 to SL4, however, any suitable arrangement may be utilized in association with exemplary embodiments described herein.

The second flexible circuit board 400-F may be mounted on the non-display region NDR of the touch screen 400. Although not illustrated in detail, pads of the touch screen 400 and pads of the second flexible circuit board 400-F may be electrically connected to each other by a conductive adhesive film. The conductive adhesive film may be an anisotropic conductive film (ACF). It is also contemplated that a solder bump(s) may replace the conductive adhesive film. A driver IC 400-IC for driving the touch screen 400 may be mounted on the second flexible circuit board 400-F. The driver IC 400-IC generates transmission Tx signals for driving the touch screen 400. The Tx signals may be alternating current (AC) signals applied to sensors as Tx signals (e.g., touch driving signals for input point detection). Additionally, the driver IC 400-IC calculates the coordinate information of an input point from receive Rx signals received from the touch screen 400. Receive signals Rx, as reception signals, may be AC signals obtained when transmission Tx signals are changed by an external input, e.g., changed based on a changed in capacitance associated with a touch or hovering action.

Referring to FIG. 5B, a sensor block SB-R will be described in more detail. The sensor block SB-R shown in FIG. 5B may correspond to the sensor blocks SB shown in FIG. 5A. The sensor block SB-R includes k first sensors RP-1 to RP-k arranged in the first direction axis DR1. Herein, k is a natural number of 2 or more. The sensor block SR-R may be divided into j sensor groups TP-G1 to TP-Gj. Herein, j is a natural number of two or more. The first to j-th sensor groups (TP-G1 to TP-Gj) are arranged along the first direction axis DR1. The j sensor groups TP-G1 to TP-Gj are in one-to-one correspondence with k first sensors RP-1 to RP-k. Each of the first to j-th sensor groups (TP-G1 to TP-Gj) may include i second sensors (TP1 to TPi). Herein, i is a natural number of two or more.

FIG. 5C illustrates the touch screen 400 in more detail, according to one or more exemplary embodiments. The touch screen 400 including two sensor columns SC1 and SC2 and four sensor rows SL1 to SL4 is exemplarily illustrated. A connection relationship of the first sensor column SC1 and signal lines described below may be identically applied to other sensor columns and signals of the touch screen 400.

The first sensor column SC1 including each of the four sensor blocks SB1 to SB4 arranged along the second direction axis DR2 is exemplarily illustrated. Four sensor blocks SB1 to SB4 including the three first sensors RP-1 to RP-3 and the three sensor groups TP-G1 to TP-G3 are exemplarily shown. The three sensor groups TP-G1 to TP-G3 include three second sensors TP1 to TP3 are exemplarily shown. Each of the sensor columns SC1 and SC2 may be divided into a plurality of sub-columns S-1, S-2, and S-3. Each of the sub-columns S-1, S-2, and S-3 may include one first sensor and one sensor group of each of the four sensor blocks SB1 to SB4. The first sensor column SC1 of a sensor block may be divided into first to third sub-columns S-1, S-2, and S-3. Hereinafter, for convenience of description, reference numerals "SL1-1 to SL1-4" are written to only the first sub-columns S-1. The number of sub-columns between the sensor columns SC1 and SC2 may vary. Signal lines connected to the four sensor blocks SB1 to SB4 are disposed in the display region DR. First signal lines SL1-1 to SL1-4 are connected to a plurality of first sensors RP-1, RP-2, and RP-3 of the four sensor blocks SB1 to SB4. To this end, the first sensors RP-1, RP-2, and RP-3 are electrically separated from each other by a unit of the sensor blocks SB1 to SB4. For example, the first sensors RP-1, RP-2, and RP-3 of the first sensor block SB1 and the first sensors RP-1, RP-2, and RP-3 of the second sensor block SB2 may receive or transmit different signals. The first sensors RP-1, RP-2, and RP-3 of the first sensor block SB1 may receive or transmit the same signals and the first sensors RP-1, RP-2, and RP-3 of the second sensor block SB2 may receive or transmit the same signals.

A first type of lines SL1-1 among the first signal lines SL1-1 to SL1-4 are connected to the first sensors RP-1 to RP-3 of the first sensor block SB1. A second type of lines SL1-2, a third type of lines SL1-3, and a fourth type of lines SL1-4 among the first signal lines SL1-1 to SL1-4 are respectively connected to the first sensors RP-1 to RP-3 of the second sensor block SB2, the first sensors RP-1 to RP-3 of the third sensor block SB3, and the first sensors RP-1 to RP-3 of the fourth sensor block SB4. Pads PD1-1 to PD1-4 (hereinafter referred to as first pads) are respectively connected to first ends of the first signals lines SL1-1 to SL1-4 disposed at each of the first to third sub-columns S-1, S-2, and S-3. The first pads PD1-1 to PD1-4 may be disposed in the non-display region NDR.

Second sensors of the first to fourth sensor blocks SB1 to SB4 are electrically connected to respectively corresponding second sensors of another of the first to fourth sensor blocks SB1 to SB4. Hereinafter, a connection relationship of corresponding second sensors in different sensor blocks will be described in more detail.

For example, corresponding second sensors of sequentially-disposed two sensor blocks among the first to fourth sensor blocks SB1 to SB4 have the following connection relationship. The m-th second sensor among the i second sensors of the n-th sensor group among the j sensor groups of one sensor block among the two sensor blocks is electrically connected to the i−m+1-th second sensor among the i second sensors of the n-th sensor group among the j sensor groups of the remaining one among the two sensor blocks. Herein, n is a natural number of 1 or more and less than j, m is a natural number of 1 or more and less than i. For example, the first second sensor among the three second sensors of the first sensor group among the three sensor groups of the second sensor block SB2 is electrically connected to the third second sensor among the three second sensors of the first sensor group among the three sensor groups of the third sensor block SB3. The second signal lines SL2-1 to SL2-3 connect corresponding second sensors of different sensor blocks. The second signal lines SL2-1 to SL2-3 electrically connect the m-th second sensor of the n-th sensor group of one sensor block among the two sensor blocks and the i−m+1-th second sensor of the n-th sensor group the remaining one among the two sensor blocks.

A connection relationship of the second sensors is described with reference to the second signal lines SL2-1 to SL2-3 arranged in the first sub-column S-1 among the first to third sub-columns S-1, S-2, and S-3 of the first sensor column SC1. The first type line SL2-1 among the second signal lines SL2-1 to SL2-3 connects the first second sensor of the first sensor group TP-G1 of the first sensor block SB1, the third second sensor of the first sensor group TP-G1 of the second sensor block SB2, the first second sensor of the first sensor group TP-G1 of the third sensor block SB3, and the third second sensor of the first sensor group TP-G1 of the fourth sensor block SB4. The second type lines SL2-2 among the second signal lines SL2-1 to SL2-3 connect the second sensors of the first sensor groups TP-G1 of the first to fourth sensor blocks SB1 to SB4. The third type line SL2-3 among the second signal lines SL2-1 to SL2-3 connects the third second sensor of the first sensor group TP-G1 of the first sensor block SB1, the first second sensor of the first sensor group TP-G1 of the second sensor block SB2, the third second sensor of the first sensor group TP-G1 of the third sensor block SB3, and the first second sensor of the first sensor group TP-G1 of the fourth sensor block SB4.

Pads PD2-1 to PD2-3 (hereinafter referred to as second pads) are respectively connected to first ends of the second signals lines SL2-1 to SL2-3 disposed at each of the first to third sub-columns S-1, S-2, and S-3. The second pads PD2-1 to PD2-3 may be disposed in the non-display region NDR.

The first sensors RP-1, RP-2, and RP-3, the second sensors of the sensor groups TP-G1 to TP-G3, the first signal lines SL1-1 to SL1-4, and the second signal lines SL2-1 to SL2-3 may be disposed on the same layer as one another. The first sensors RP-1, RP-2, and RP-3, the second sensors of the first sensors RP-1, RP-2, and RP-3, the first signal lines SL1-1 to SL1-4, and the second signal lines SL2-1 to SL2-3 may be formed by patterning a conductive layer formed during the same process as one another.

FIG. 5D exemplarily illustrates the second flexible circuit board 400-F connected to the touch screen 400 of shown in FIG. 5C, according to one or more exemplary embodiments. According to a configuration of the touch screen 400, a configuration of the second flexible circuit board 400-F may be changed.

Referring to FIG. 5D, the second flexible circuit board 400-F includes a plurality of pads and a plurality of signal lines. Hereinafter, in order to describe the first signal lines SL1-1 to SL1-4 shown in FIG. 5C and the second signal lines SL2-1 to SL2-3 distinguishingly, signal lines disposed on the second flexible circuit board 400-F are referred to as connection lines.

The second flexible circuit board 400-F includes a plurality of insulation layers and a plurality of conductive layers disposed between the insulation layers. Some conductive layers among the conductive layers may include pads. Connection lines disposed on different layers may be electrically connected through contact holes penetrating an insulation layer. The plurality of pads may include pads (hereinafter referred to as third pads) PD3-1 to PD3-3 corresponding to the first pads PD1-1 to PD1-4 shown in FIG. 5C, and pads (hereinafter referred to as fourth pads) PD4-1 to PD4-3 corresponding to the second pads PD2-1 to PD2-3. The connection lines of the first signal line groups SL-F1 and the connection lines of the second signal line groups SL-F2 may be respectively connected to the third pads PD3-1 to PD3-4 and the fourth pads PD4-1 to PD4-3. Each of the first signal line groups SL-F1 and the second signal line groups SL-F2 forms groups to correspond to the first to third sub-columns S-1, S-2, and S-3 described with reference to FIG. 5C and is spaced apart from each other by a group unit.

The connection lines of the third signal line group SL-F3 are respectively connected to the connection lines of the first signal line groups SL-F1 relating to the first sensor column SC1. For example, the first connection line among the connection lines of the third signal line group SL-F3 connects the connection lines of the first signal line groups SL-F1 connected to the third pads PD3-1 corresponding to the first sensor column SC1. The third pads PD3-1 are electrically connected to the first pads PD1-1 (see FIG. 5C) of the first to third sub-columns S-1, S-2, and S-3 of the first sensor column SC1. As a result, the first sensors RP-1, RP-2, and RP-3 of the first sensor block SB1 of the first sensor column SC1 are electrically connected to each other.

The connection lines of the fourth signal line group SL-F4 are respectively connected to the connection lines of the first signal line groups SL-F1 relating to the second sensor column SC2. For example, the first connection line among the connection lines of the fourth signal line group SL-F4 connects the connection lines of the first signal line groups SL-F1 connected to the third pads PD3-1 corresponding to the second sensor column SC2. The third pads PD3-1 are electrically connected to the first pads PD1-1 (see FIG. 5C) of the first to third sub-columns S-1, S-2, and S-3 of the second sensor column SC2. As a result, the first sensors RP-1, RP-2, and RP-3 of the first sensor block SB1 of the second sensor column SC2 are electrically connected to each other.

The signal lines of the fifth signal line group SL-F5 connect the connection lines of the second signal line groups SL-F2. For example, the first connection line among the connection lines of the fifth signal line group SL-F5 connects the connection lines of the second signal line groups SL-F2 connected to the fourth pads PD4-1 corresponding to the first sensor column SC1 and the second sensor column SC2. The fourth pads PD4-1 are electrically connected to the second pads PD2-1 (see FIG. 5C) of the first sensor column SC1 and the second sensor column SC2. As a result, the second sensors connected to the second signal line SL2-3 of the first sub-column S-1 of the first sensor column SC1 and the second sensors connected to the second signal line SL2-3 of the first sub-column S-1 of the second sensor column SC2 are electrically connected to each other.

The signal lines of the third signal line group SL-F3 connect the signal lines of the first signal line groups SL-F1 relating to the first sensor column SC1. For example, one of the signal lines of the third signal line group SL-F3 connects first signal lines that are electrically connected to the first pads PD1-1 of the first to third sub-columns S-1, S-2, and S-3 in the first sensor column SC1.

The connection lines of the sixth signal line group SL-F6 connect the connection lines of the third signal line groups SL-F3 to the driver IC 400-IC. The connection lines of the seventh signal line group SL-F7 connect the connection lines of the fourth signal line groups SL-F4 to the driver IC 400-IC. The connection lines of the eighth signal line group SL-F8 connect the connection lines of the fifth signal line groups SL-F5 to the driver IC 400-IC. The third pads PD3-1 to PD3-4 and the fourth pads PD4-1 to PD4-3 are connected to the driver IC 400-IC through the sixth signal line group SL-F6, the seventh signal line group SL-F7, and the eighth signal line group SL-F8 so that the pad number of the driver IC 400-IC may be reduced compared to the number of the third pads PD3-1 to PD3-4 and the fourth pads PD4-1 to PD4-3.

In addition, the connection lines of the ninth signal line group SL-F9 where each first end is connected to the driver IC 400-IC may be disposed at the second flexible circuit board 400-F. Although not shown in detail, first of the connection lines of the ninth signal line group SL-F9 may be respectively connected to the pads of the driver IC 400-IC. Second ends of the connection lines of the ninth signal line group SL-F9 may be respectively connected to the fifth pads PD5. The second flexible circuit board 400-F may be electrically connected to another circuit board or an electronic component, such as a connector, through the fifth pads PD5. Control signals for driving the touch screen 400 may be received from the central control circuit disposed at the other circuit board through the fifth pads PD5. Control signals for driving the touch screen 400 may be signals for controlling a scan driving circuit 410, a touch detection circuit 420, and a switching circuit 430, which are described with reference to FIGS. 5E and 5F.

As shown in FIG. 5E, the driver IC 400-IC may include the scan driving circuit 410 providing Tx signals Tx-S and the touch detection circuit 420 calculating the coordinate information of an input point from Rx signals Rx-S. The Tx signals Tx-S may be provided to one type of sensors of the plurality of first sensors RP (see FIG. 5A) and the plurality of second sensors TP (see FIG. 5A) through the connection lines of the second flexible circuit board 400-F. The Rx signals Rx-S may be provided to the touch detection circuit 420 from other sensors among the plurality of first sensors RP and the plurality of second sensors TP through the connection lines of the second flexible circuit board 400-F. In this manner, the coordinate information of an input point may be obtained through a mutual capacitance method.

Hereinafter, it is exemplarily described that the Tx signals Tx-S are provided to the second sensors TP. The scan driving circuit 410 provides Tx signals Tx-S having different information to the second sensors TP. The Tx signals Tx-S are AC signals. Herein, "Tx signals Tx-S have different information" means that Tx signals Tx-S have different time information, frequency information, and code information. The Tx signals Tx-S modulated through time division multiple access may be activated in different sections. That is, sections that Tx signals Tx-S have high levels may vary. The Tx signals Tx-S modulated through time division multiple access may have different frequencies. The Tx signals Tx-S modulated through time division multiple access may have different code information.

The first sensor RP and the second sensor TP adjacent to each other are capacitively coupled due to Tx signals Tx-S applied to the second sensors TP (see FIG. 5A). When an input means is disposed on the capacitively coupled first sensor RP and second sensor TP, a capacitance between the first sensor RP and the second sensor TP is changed. The touch detection circuit 420 calculates the coordinate information of an input means by detecting the changed capacitance. For example, although not shown, the touch detection circuit 420 may include an amplifier, a noise filter, and an analog to digital converter. The amplifier amplifies the received Rx signals Rx-S. The noise filter removes noise of the amplified Rx signals Rx-S. The analog to digital converter converts the noise-removed Rx signals Rx-S into digital signals. The coordinate information of an input point may be calculated from the digital signals.

As shown in FIG. 5F, a driver IC 400-IC10 may include a scan driving circuit 410, a touch detection circuit 420, and a switching circuit 430. The coordinate information of an input may be obtained through a self-capacitance method or a mutual capacitance method. The switching circuit 430 selectively connects the scan driving circuit 410 and the touch detection circuit 420 to the third pads PD3-1 to PD3-4 (see FIG. 5D) and the fourth pads PD4-1 to PD4-3 (see FIG. 5D). This is for selectively providing Tx signals Tx-S to the first sensors RP (see FIG. 5A) and the second sensors TP (see FIG. 5A).

The switching circuit 430 may include a first switch SW1 that selectively connects the third pads PD3-1 to PD3-4 to the scan driving circuit 410 and the touch detection circuit 420 and a second switch SW2 that selectively connects the fourth pads PD4-1 to PD4-3 to the scan driving circuit 410 and the touch detection circuit 420. Although the switching circuit 430 including one first switch SW1 and one second switch SW2 is exemplarily shown, the number of first switches SW1 and second switches SW2 may be determined according to the number of sensor columns, sub-columns, and sensor rows.

A method of obtaining the coordinate information of an input point through a mutual capacitance method may be substantially identical to that described with reference to FIG. 5E. In order to obtain the coordinate information of an input point through a self-capacitance method, the Tx signals Tx-S may be provided to each of the first sensors RP and the second sensors TP. The coordinate information of an input point may be obtained by detecting changes in capacitance occurring from a sensor where the Tx signals Tx-S are provided.

Figure 6A:
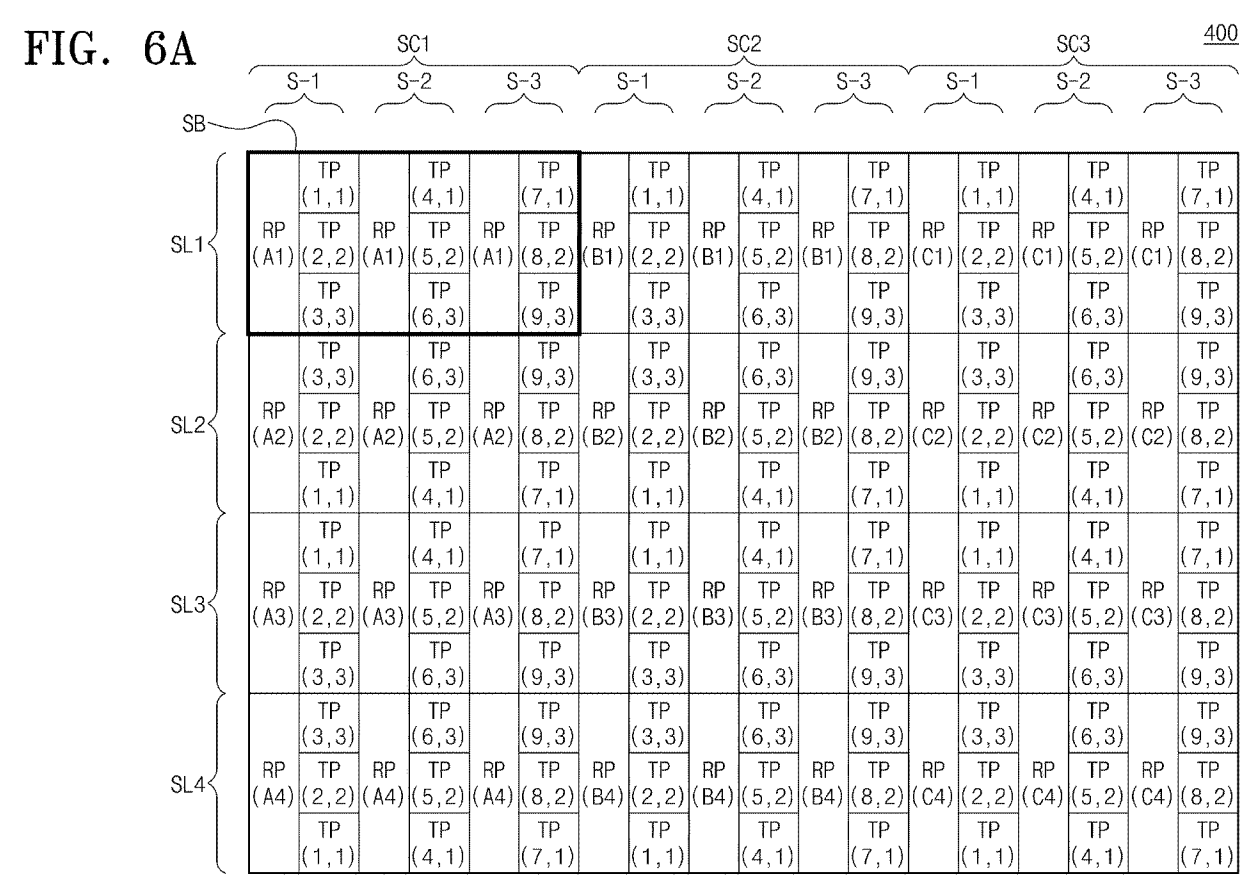
Figure 6B:
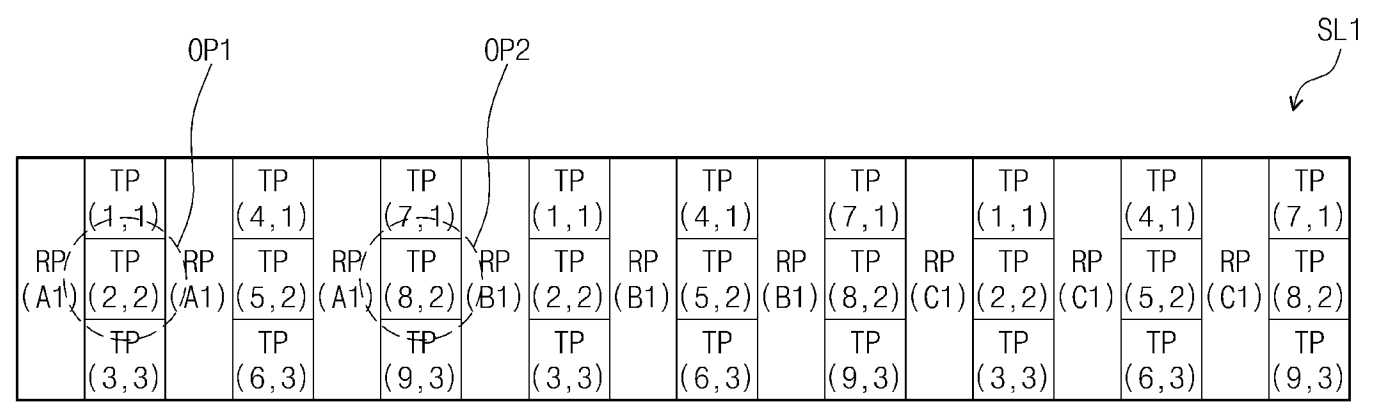
Figure 6C:
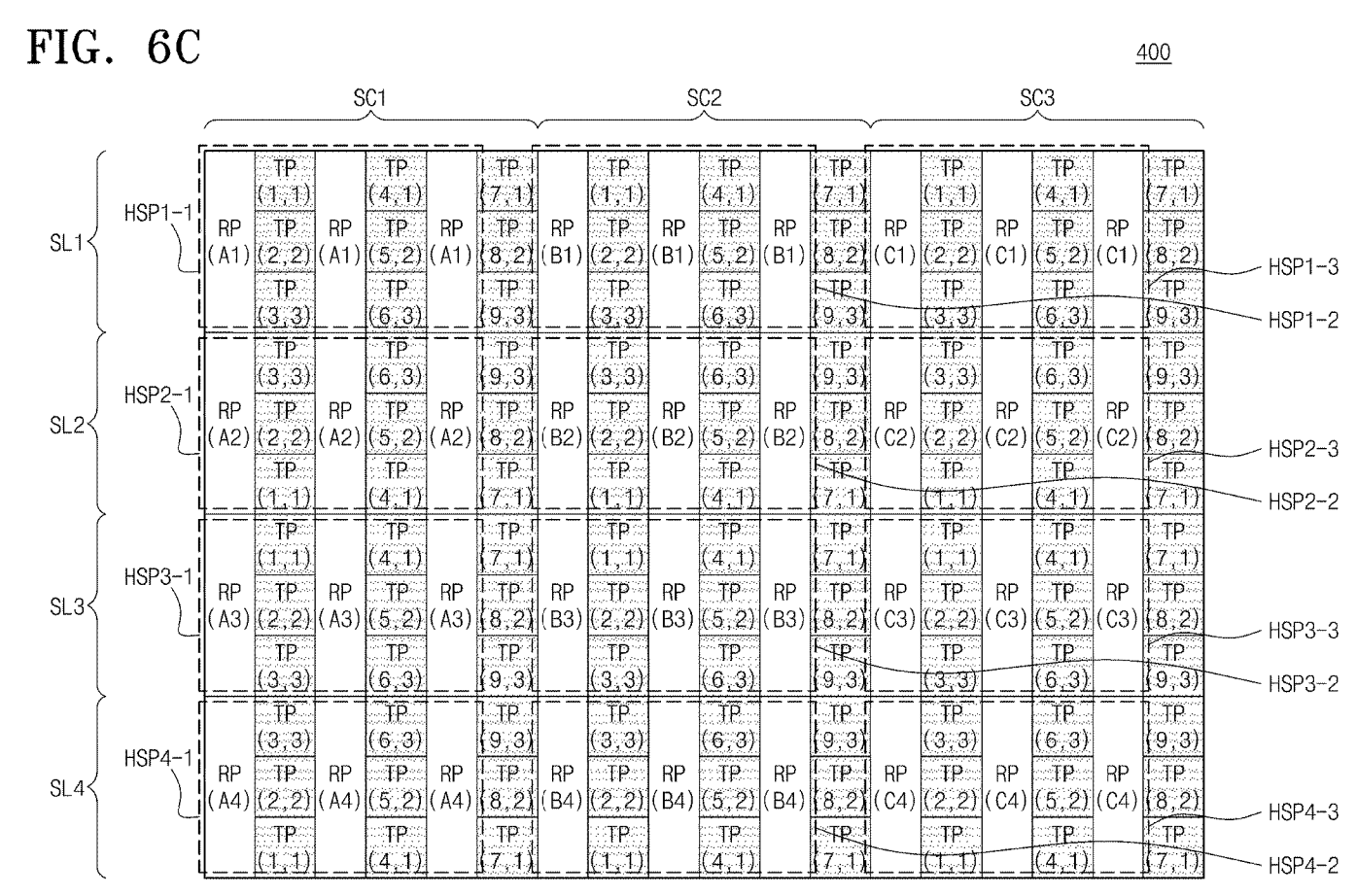

FIG. 6A is a conceptual diagram of a first operating mode of a touch screen 400, according to one or more exemplary embodiments. FIG. 6B is a conceptual diagram of a sensor row SL1 of a touch screen 400, according to one or more exemplary embodiments. FIG. 6C is a conceptual diagram of a second operating mode of a touch screen 400, according to one or more exemplary embodiments. Hereinafter, an operation of the touch screen 400 is described with reference to FIGS. 6A to 6C.

The touch screen 400 described with reference to FIGS. 5A to 5C may be simplified as shown in FIG. 6A. Symbols in parentheses displayed in the first sensors RP represent electrical connectivity. Referring to the first sensor row SL1, if the symbols A1, B1, and C1 displayed in the parentheses of the first sensors RP are the same, this means that corresponding sensors are electrically connected to each other. For example, the first sensor RP where the symbol A1 is displayed may be electrically connected through the first signal lines SL1-1, the first pads PD1-1 (see FIG. 5C), the third pads PD3-1, the connection lines of the first signal line groups SL-F1, and the connection lines of the third signal line group SL-F3. The fact that symbols A1, B1, and C1 displayed in the parentheses of the first sensors RP of the first sensor row SL1 and symbols A2, B2, and C2 displayed in the parentheses of the first sensors RP of the second sensor row SL2 are different means that corresponding sensors are electrically insulated from each other.

An X value in the symbol (X,Y) displayed in the second sensors TP represents information of a scan signal and an Y value represents an electrical connectivity between second sensors TP. Referring to one sensor block, 1 to 9 displayed with an X value represent that nine second sensors TP receive different scan signals. Referring to the sensor blocks SB of the first sensor column SC1, the four second sensors TP where an X value of the sensor rows SL1 to SL4 is 3 represents that the same scan signal is received. By the second signal line SL2-3 of the first sub-column S-1 of the first sensor column SC1 shown in FIG. 5C, the four second sensors TP where an X value is 3 may receive the same scan signal. Referring to the first sensor column SC1, 1 to 3 displayed with a Y value represents an electrical connectivity of the second sensors TP disposed on different sensor blocks in a corresponding sub-column. For example, second sensors displayed with 1 to correspond to a Y value may be connected to each other by the second signal line SL2-1 (see FIG. 5C). Second sensors displayed with 2 to correspond to Y may be connected to each other by the second signal line SL2-2 (see FIG. 5C).

Even the second sensors disposed in different sensor columns SC1 and SC2 may receive the same scan signal. The four second sensors TP having an X value of 3 disposed in the first sub-column S-1 of the first sensor column SC1 and the four second sensors TP having an X value of 3 disposed in the first sub-column S-1 of the second sensor column SC2 may receive the same scan signal. As described with reference to FIGS. 5C and 5D, the second sensor disposed in the different sensor columns SC1 and SC2 may be electrically connected through the second signal lines SL2-3 of the first sensor column SC1 and the second sensor column SC2, the second pads PD2-1 (see FIG. 5C), the fourth pads PD4-1, the connection lines of the second signal line groups SL-F2, and some connection lines of the fifth signal line group SL-F5.

Referring to FIG. 6B, two external inputs OP1 and OP2 occurring from the first sensor row SL1 are exemplarily illustrated. The first external input OP1 and the second external input OP2 may be detected separately through a mutual capacitance method.

When the first external input OP1 occurs, a capacitance between two first sensors RP(A1) and one second sensor TP(2,2) is changed. The coordinate information of an input point may be obtained from an Rx signal received from the first sensors RP(A1). When the second external input OP2 occurs, a capacitance between two first sensors RP(A1) and RP(B1) and one second sensor TP(8,2) is changed. The coordinate information of the second external input OP2 is calculated from an Rx signal received from the first sensor RP(A1) and an Rx signal received from the first sensor RP(B1). The touch detection circuit 420 shown in FIG. 5E may detect an external input occurring from the boundary between sensor blocks by adding an Rx signal received from the first sensor RP(A1) and an Rx signal received from the first sensor RP(B1).

Referring to FIG. 6C, a touch screen 400 operating using the first sensors RP through a self-capacitance method is simplified and illustrated. Each of a plurality of sensor blocks SB shown in FIG. 6A corresponds to touch sensors HP1-1 to HP4-3 (in FIG. 6C), which detect an input means of a hovering state by applying the same Tx signal to the first sensors RP in corresponding sensor blocks. A signal having the same waveform as a Tx signal applied to the first sensors RP in corresponding sensor blocks, a signal of an inverted waveform, or a bias voltage may be applied to second sensors TP in corresponding sensor blocks. An input means of a hovering state may be detected by detecting a capacitance change occurring by capacitive coupling of the input means and the touch sensors HP1-1 to HP4-3.

FIGS. 7, 8, 9, 10, 11A, 11B, 12A, 12B, 13A, 13B, and 14 are conceptual diagrams of touch screens 400-1 to 400-8, according to one or more exemplary embodiments. The touch screens 400-1 to 400-8 will be described in detail, but detailed descriptions for a configuration similar to a configuration described with reference to FIGS. 1, 2, 3, 4, 5A, 5B, 5C, 5D, 5E, 5F, 6A, 6B, and 6C will be omitted to avoid obscuring exemplary embodiments described herein.

Figure 7:
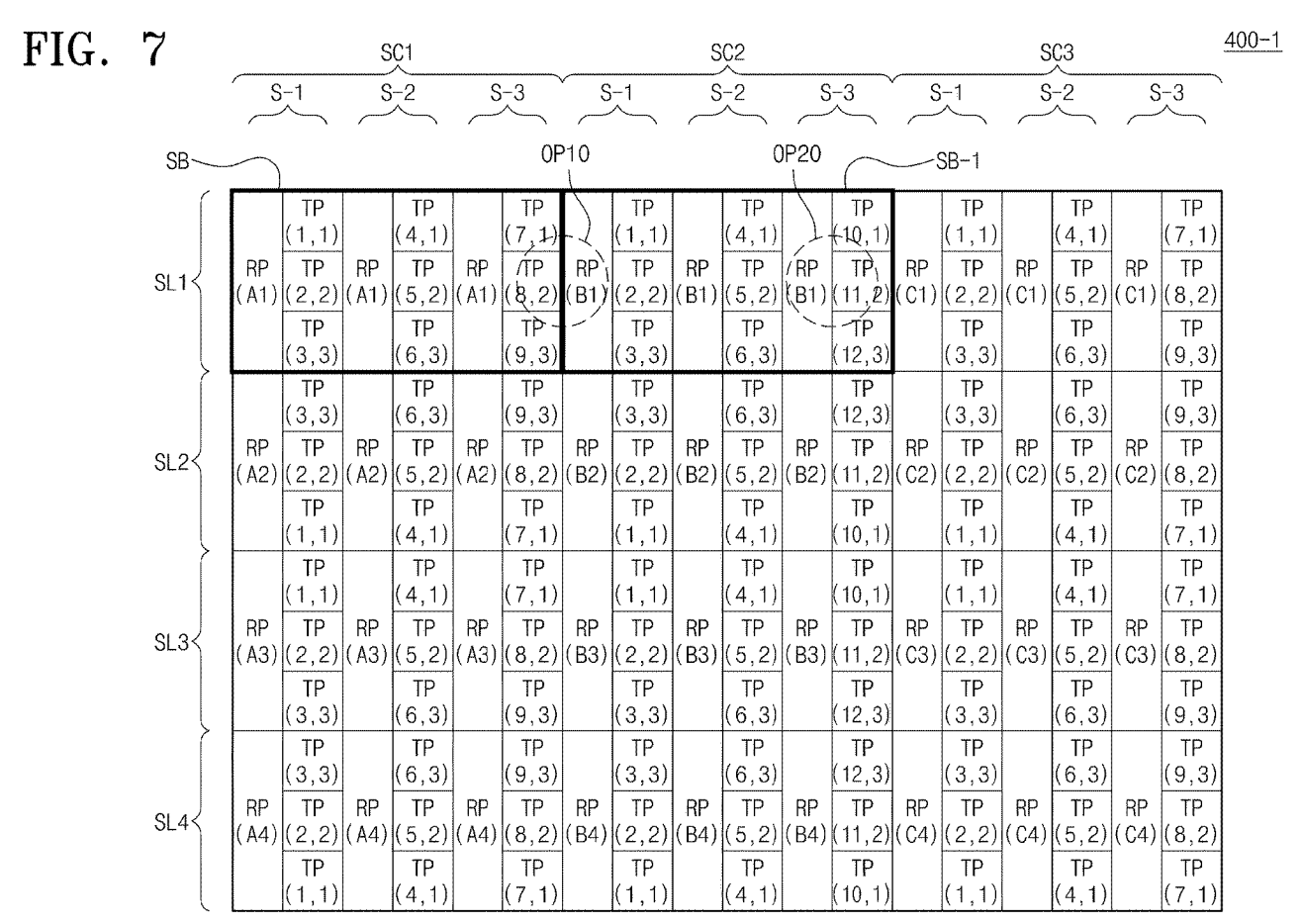

Three sensor columns SC1 to SC3 of the touch screen 400-1 are shown in FIG. 7. The second sensors TP(1,1) to TP(9,3) of the sensor block SB of the first sensor column SC1 may represents the second sensors of an odd-numbered sensor column, and the second sensors TP(1,1) to TP(6,3), and TP(10,1) to TP(12,3) of the sensor block SB-1 of the second sensor column SC2 may represents the second sensors of an even-numbered sensor column.

Referring to the first sensor row SL1 of the first sensor column SC1 and the first sensor row SL1 of the second sensor column SC2, corresponding sensors among some sensors TP(1,1) to TP(6,3) of the first sensor column SC1 and some sensors TP(1,1) to TP(6,3) of the second sensor column SC2 are electrically connected to each other. Some sensors of the first sensor column SC1 and some sensors of the second sensor column SC2 may be electrically insulated from each other. That is, different Rx signals may be received. The second sensors TP(7,1) to TP(9,3) of the third sensor group of the first sensor column SC1 and the second sensors TP(10,1) to TP(12,3) of the third sensor group of the second sensor column SC2 may receive different TX signals. In relation to sensor blocks disposed in the same sensor row, the i second sensors of the j-th sensor group among the j sensor groups of the sensor block of one sensor column, and the i second sensors of the j-th sensor group among the j sensor groups of the sensor block of another sensor column are electrically insulated from each other. Even when two external inputs OP10 and OP20 shown in FIG. 7 are touched simultaneously, a multi-touch may be identified by different Tx signals Tx-S. In comparison to the touch screen 400 shown in FIGS. 6A to 6C, a fine touch identification may be possible with respect to FIG. 7A.

Figure 8:
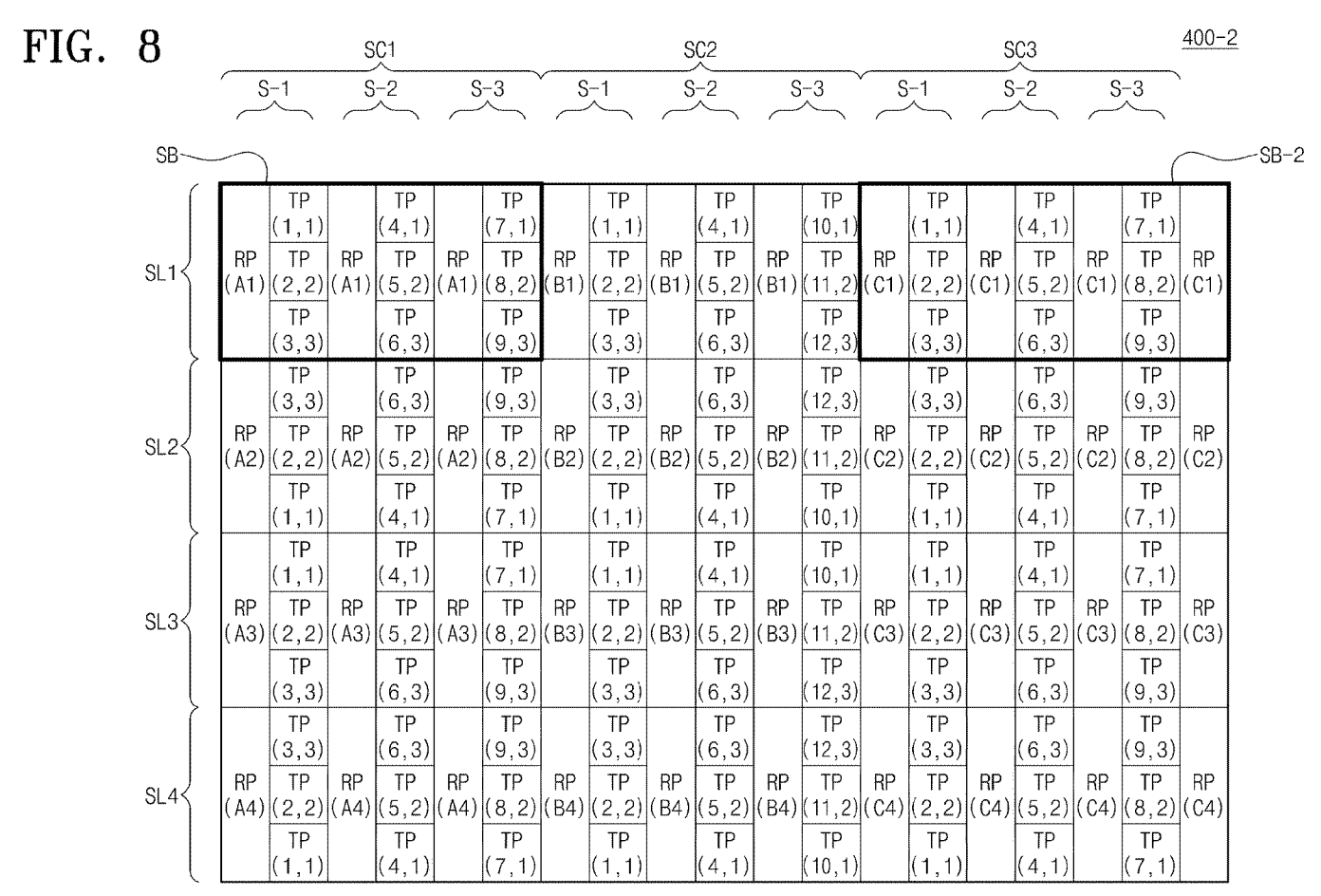

Like the touch screen 400-2 shown in FIG. 8, the sensor block SB-2 of the third sensor column SC3 may include more first sensors RP than the sensor block SB of the first sensor column SC1. The second sensor TP disposed in the third sub-column S-3 of the sensor column SC3 is capacitively coupled with two first sensors RP. In this manner, an external input adjacent to the second sensor TP disposed in the third sub-column S-3 of the third sensor column SC3 may be detected from Rx signals occurring from two first sensors RP adjacent to the second sensor TP disposed in the third sub-column S-3 of the third sensor column SC3. An external input occurring from the frame of the touch screen 400-2 may be detected by adding Rx signals received from two first sensors RP adjacent to the second sensor TP disposed in the third sub-column S-3. To this end, a touch screen 400-2 including three sensor columns SC1, SC2, and SC3 is exemplarily described, and in relation to a touch screen including s sensor columns, the s-th sensor column may include more first sensors than the remaining sensor columns.

Figure 9:
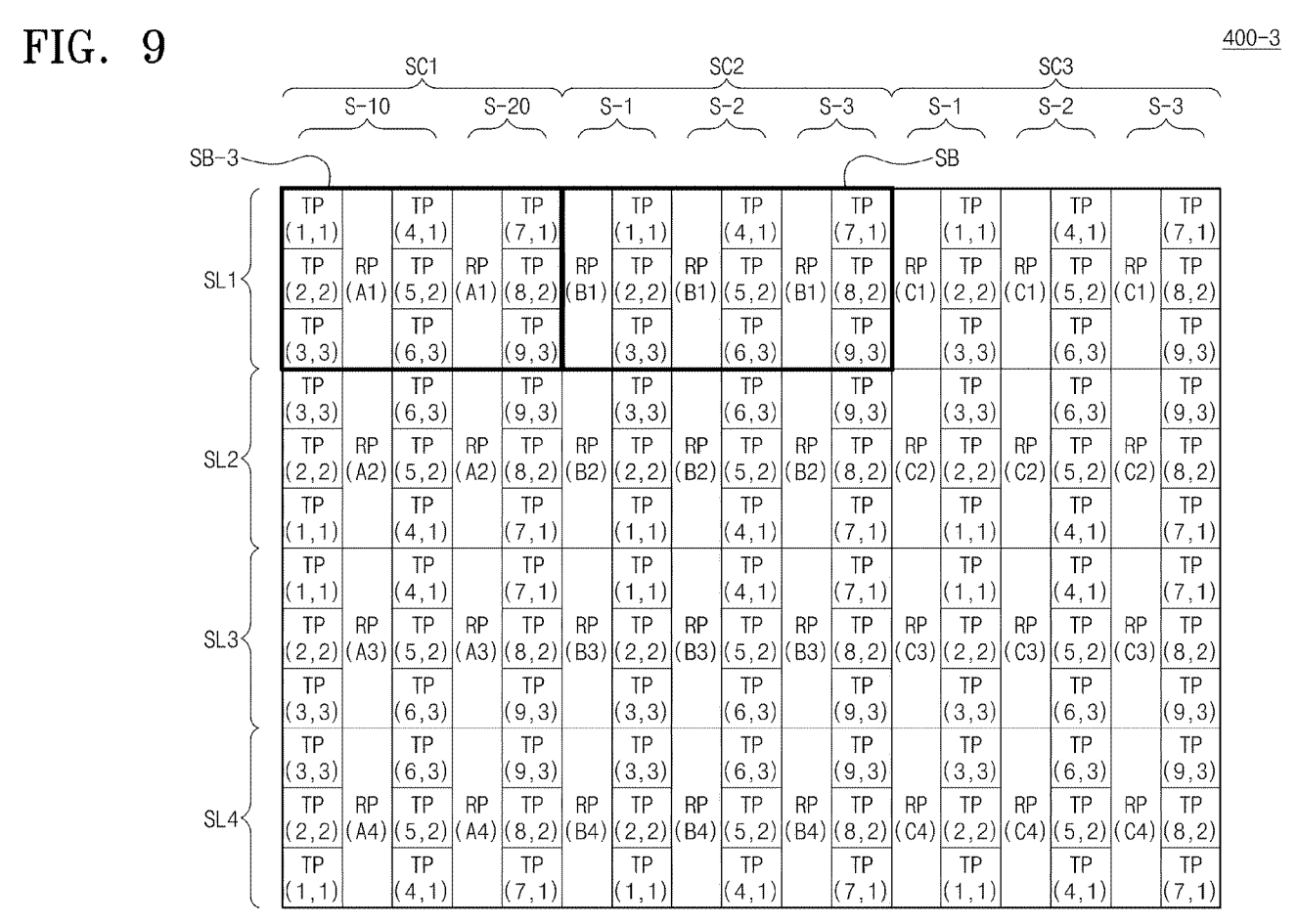

Like the touch screen 400-3 shown in FIG. 9, a different number of second sensors TP may be provided according to the sensor blocks SB and SB-3. That is, the first sensors RP-1 to RP-k (see FIG. 5B) in a sensor block and the sensor groups TP-G1 to TP-Gj (see FIG. 5B) may not be in one-to-one correspondence. The first sub-column S-10 of the first sensor column SC1 may include two sensor groups in correspondence with one first sensor RP.

Figure 10:
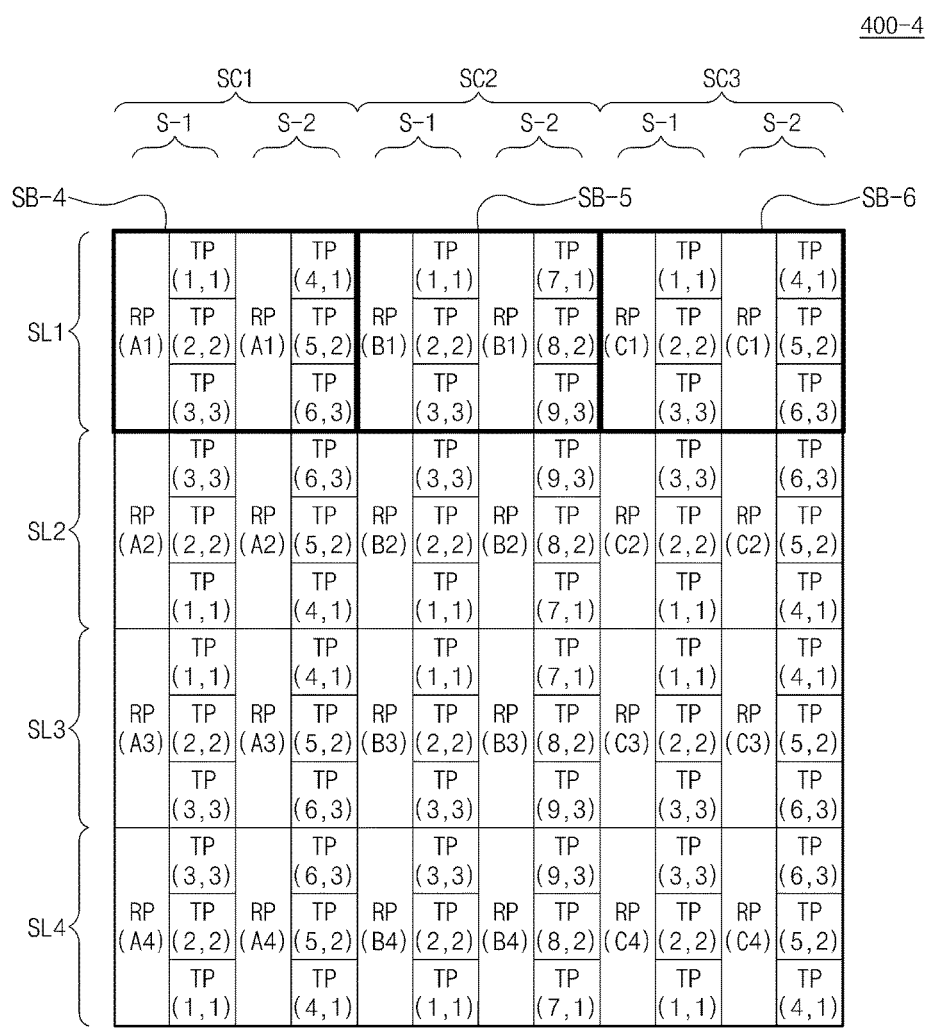

Like the touch screen 400-4 shown in FIG. 10, each of the sensor columns SC1, SC2, and SC3 may include two sub-columns S-1 and S-2. Each of the sensor blocks SB-4, SB-5, and SB-6 may include two first sensors RP and two sensor groups. Each of the sensor blocks may include four or more first sensors RP and sensor groups corresponding thereto.

According to one or more exemplary embodiments, the second sensors TP of some sensor blocks SB-4 and SB-6 may receive the same Tx signals, and the second sensors TP of some sensor blocks SB-4 and SB-6 and the second sensors TP of the remaining sensor block SB-5 may receive partially different Tx signals. Such a configuration has been described with reference to FIG. 7, and, therefore, a detailed description will be omitted.

Figure 11A:
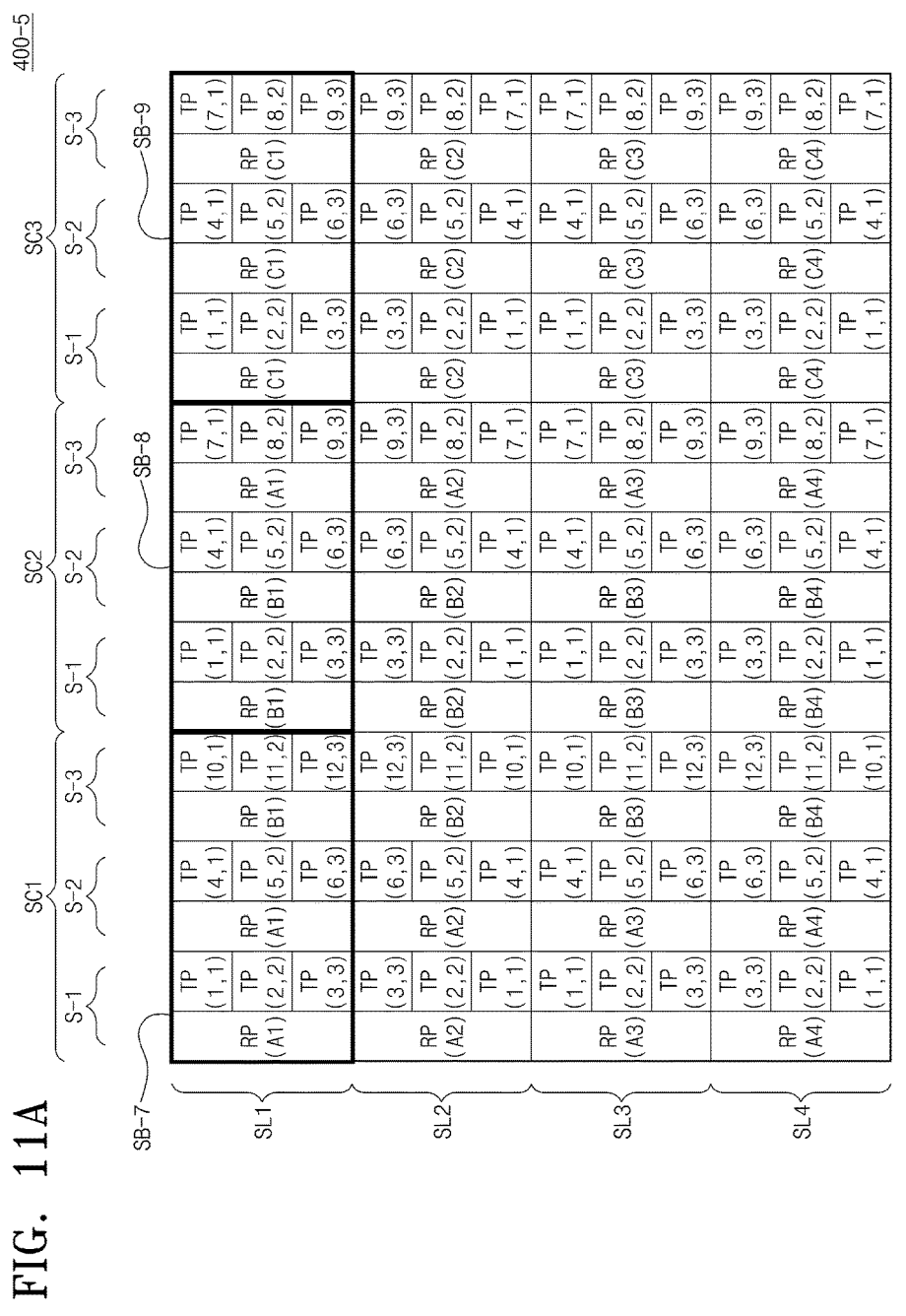

Like the touch screen 400-5 shown in FIG. 11A, a plurality of first sensors RP connected to each other electrically among a plurality of first sensors RP may not be disposed sequentially. That is, some sensor blocks SB-7 and SB-8 among the sensor blocks SB-7, SB-8, and SB-9 include a first type of sensor and a second type of sensor, which are distinguished according to an electrical connection relationship. At least the first type of sensor is provided in plurality. The second type of sensor may be provided as one or more. The first type of sensors are electrically connected to each other and the second type sensors are electrically connected to each other. The first type of sensors and the second type of sensors are electrically insulated from each other.

Figure 11B:
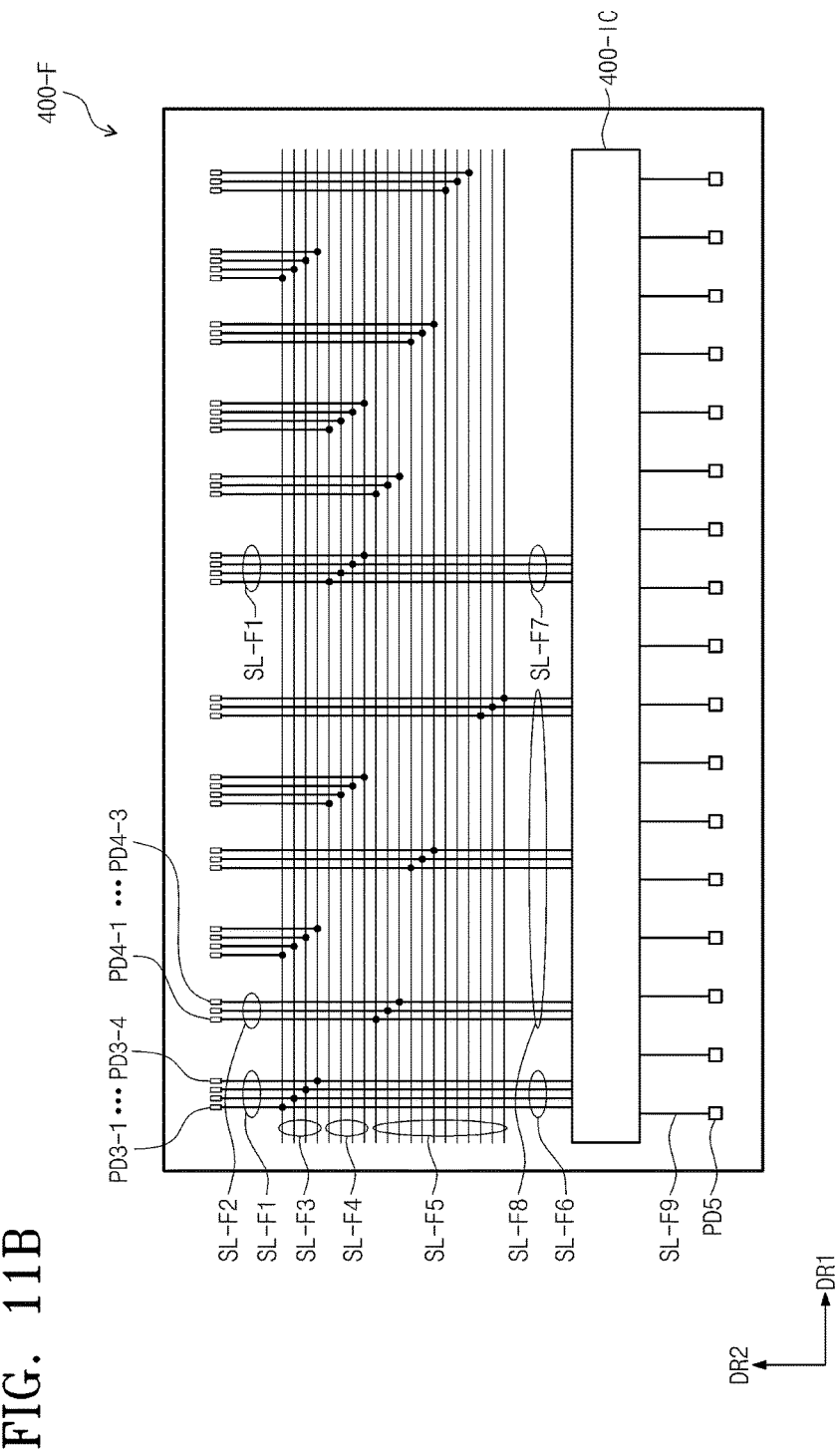

In relation to the touch screen 400-5 shown in FIG. 11A, the positions of the third sub-columns S-3 of the first and second sensor columns SC1 and SC2 are changed in comparison to the touch screen 400-1 shown in FIG. 7. The connection relationship of the connection lines SL-F1 to SL-F8 shown in FIG. 5D is changed as shown in FIG. 11B, such that some first sensors RP disposed discontinuously among a plurality of first sensors RP may be electrically connected together.

Figure 12A:
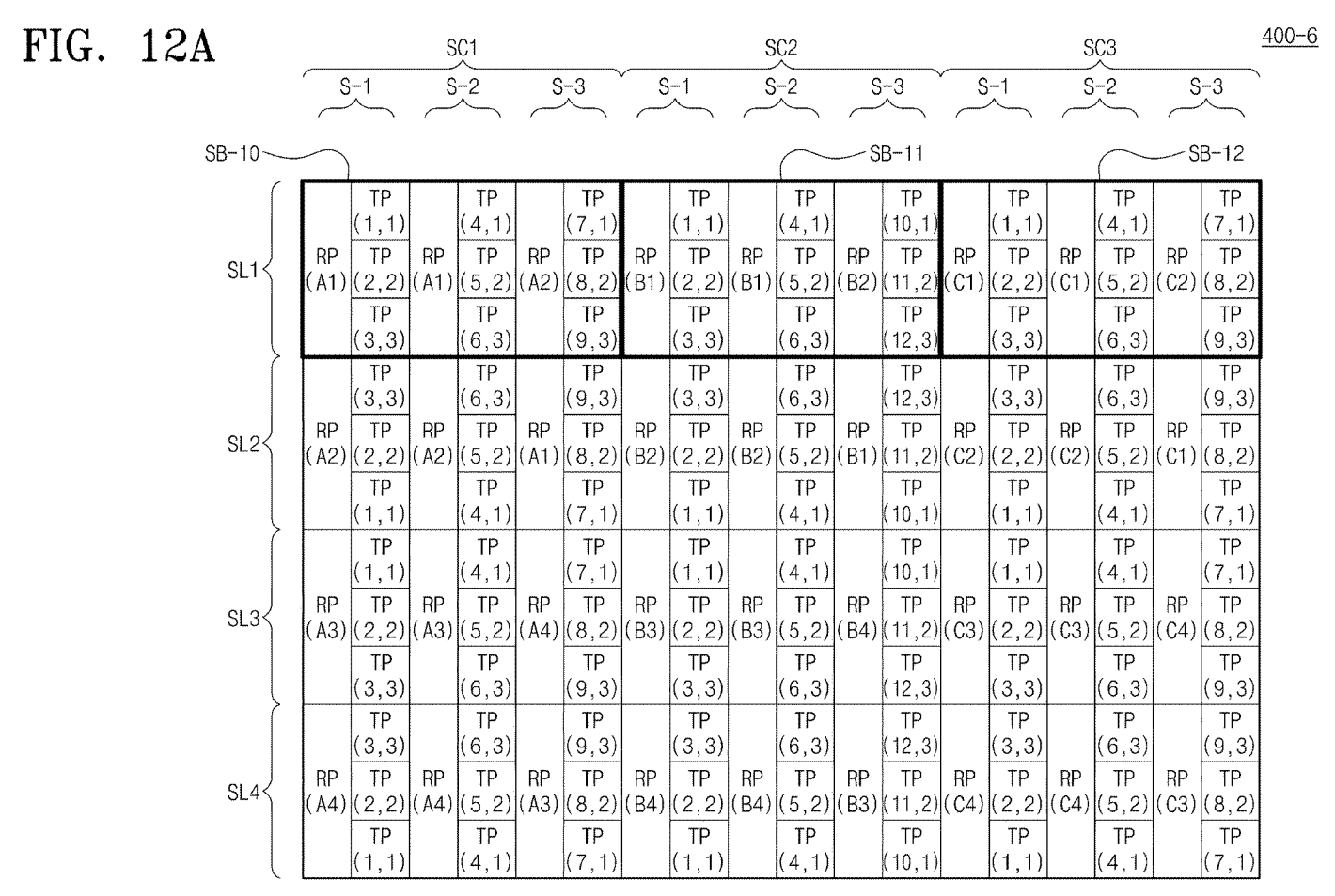
Figure 12B:
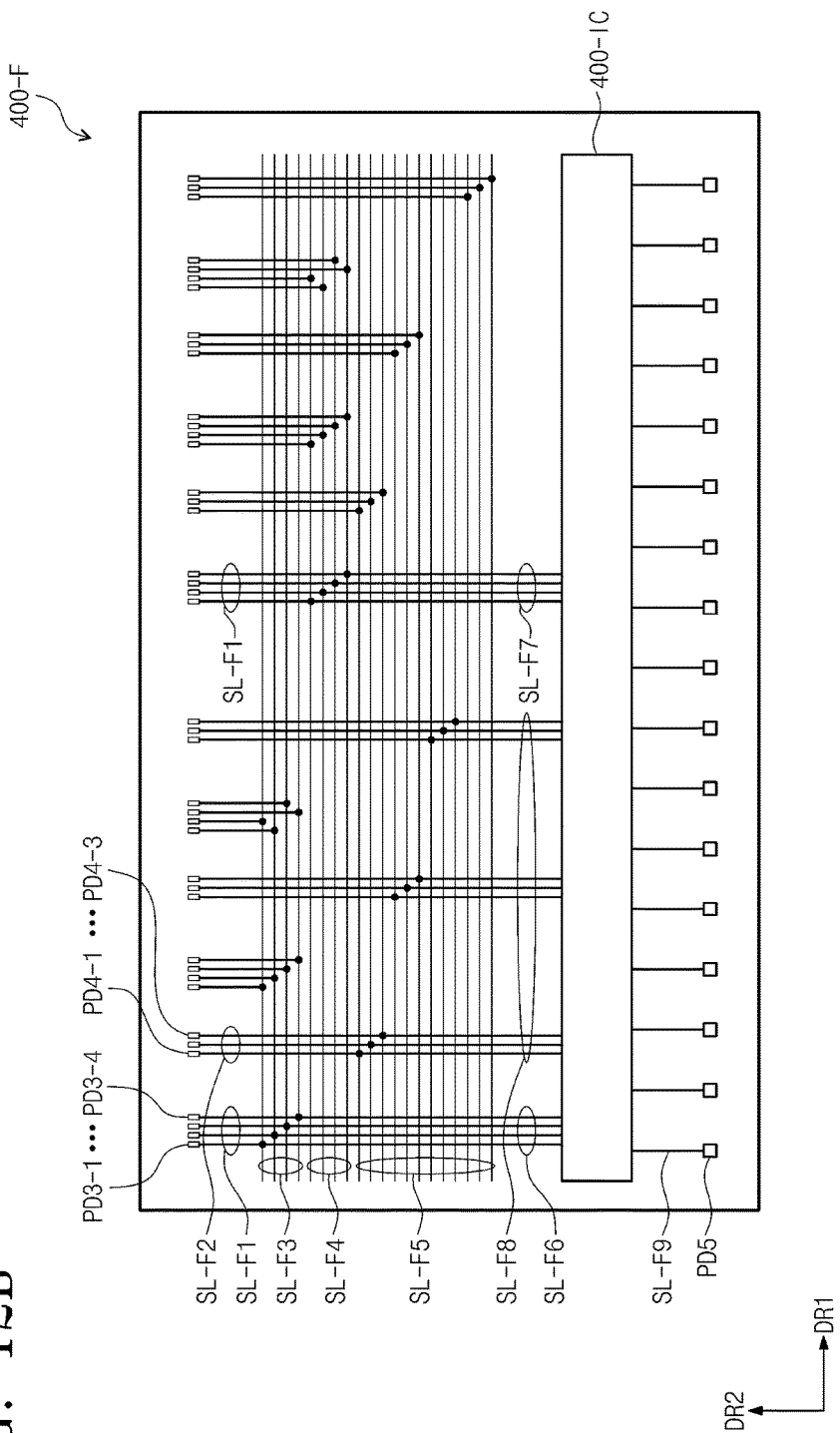

In relation to the touch screen 400-6 shown in FIG. 12A, in comparison to the touch screen 400-5 shown in FIG. 7, the electrically-connected first touch sensors RP may be disposed in different sensor rows. The sensor blocks SB-10, SB-11, and SB-12 may include two first type sensors and one second type sensor. The connection relationship of the connection lines SL-F1 to SL-F8 shown in FIG. 5B is changed as shown in FIG. 12B, such that some first sensors RP disposed in different sensor rows among a plurality of first sensors RP may be electrically connected together.

Figure 13A:
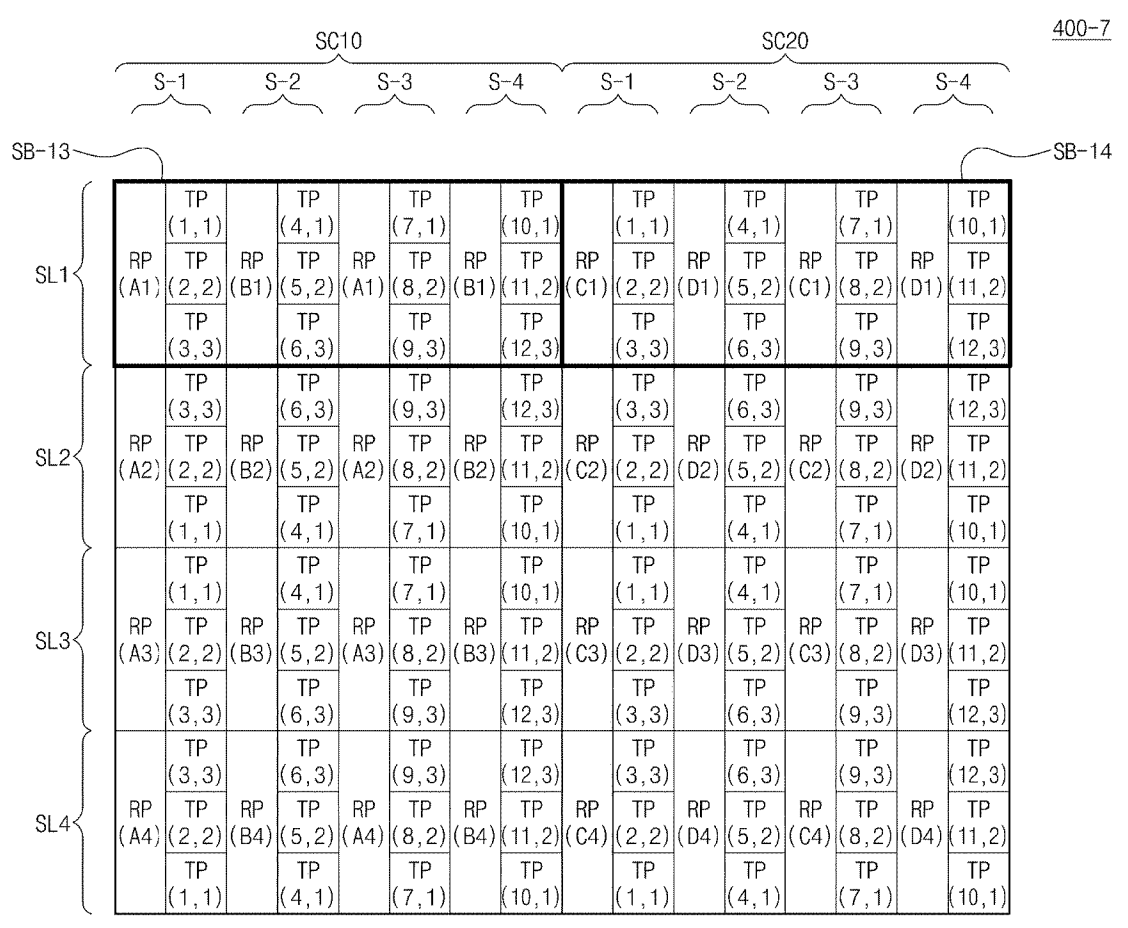

In relation to the touch screen 400-7 shown in FIG. 13A, each of the sensor columns SC10 and SC20 includes four sub-columns S-1 to S-4. Each of the sensor blocks SB-13 and SB-14 includes four first sensors RP. The sensor blocks SB-13 and SB14 include the first type sensors and the second type sensors, which are alternately disposed along the direction where the sensor columns SC10 and SC20 are disposed.

Referring to the sensor block SB-13 disposed in the first sensor row SL1 and the first sensor column SC10, two first type first sensors RP(A1) and two second type first sensors RP(B1) are disposed in a sensor block. When the connection relationship of the connection lines SL-F1 to SL-F8 shown in FIG. 5D is changed as described with reference to FIGS. 11B and 12B, electrically insulated first sensors and electrically connected first sensors may be disposed in one sensor block at the same time.

Figure 13B:
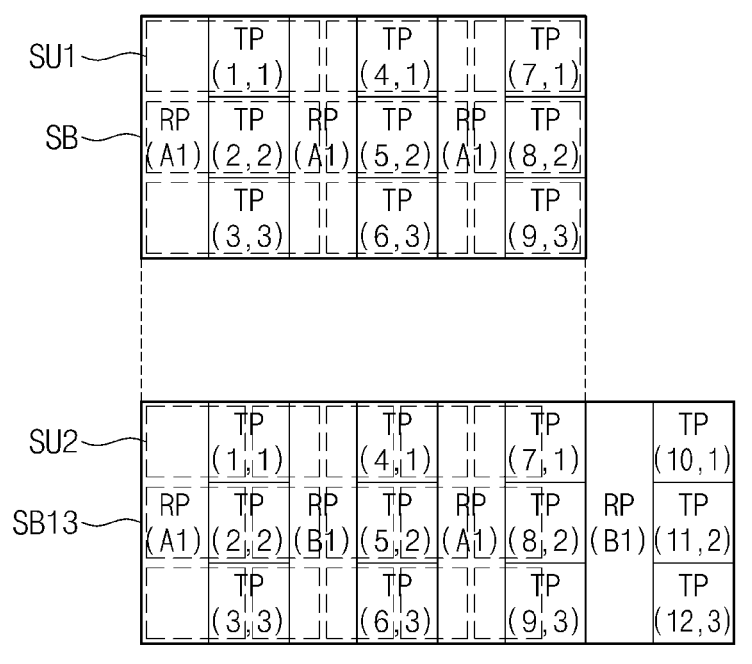

FIG. 13B is a view when the sensing unit SU1 of the sensor block SB shown in FIG. 6A is compared with the sensing unit SU2 of the sensor block SB-13 shown in FIG. 13A. The sensing units SU1 and SU2 correspond to external inputs distinguished from each other. In the same area, nine sensing units SU1 (designated by dashed line boxes) are defined in the sensor block SB shown in FIG. 6A and fifteen sensing units SU2 are defined in the sensor block SB-13 shown in FIG. 13A. In comparison to the sensor block SB shown in FIG. 6A, a more accurate touch detection is possible in the sensor block SB-13 shown in FIG. 13A.

Figure 14:
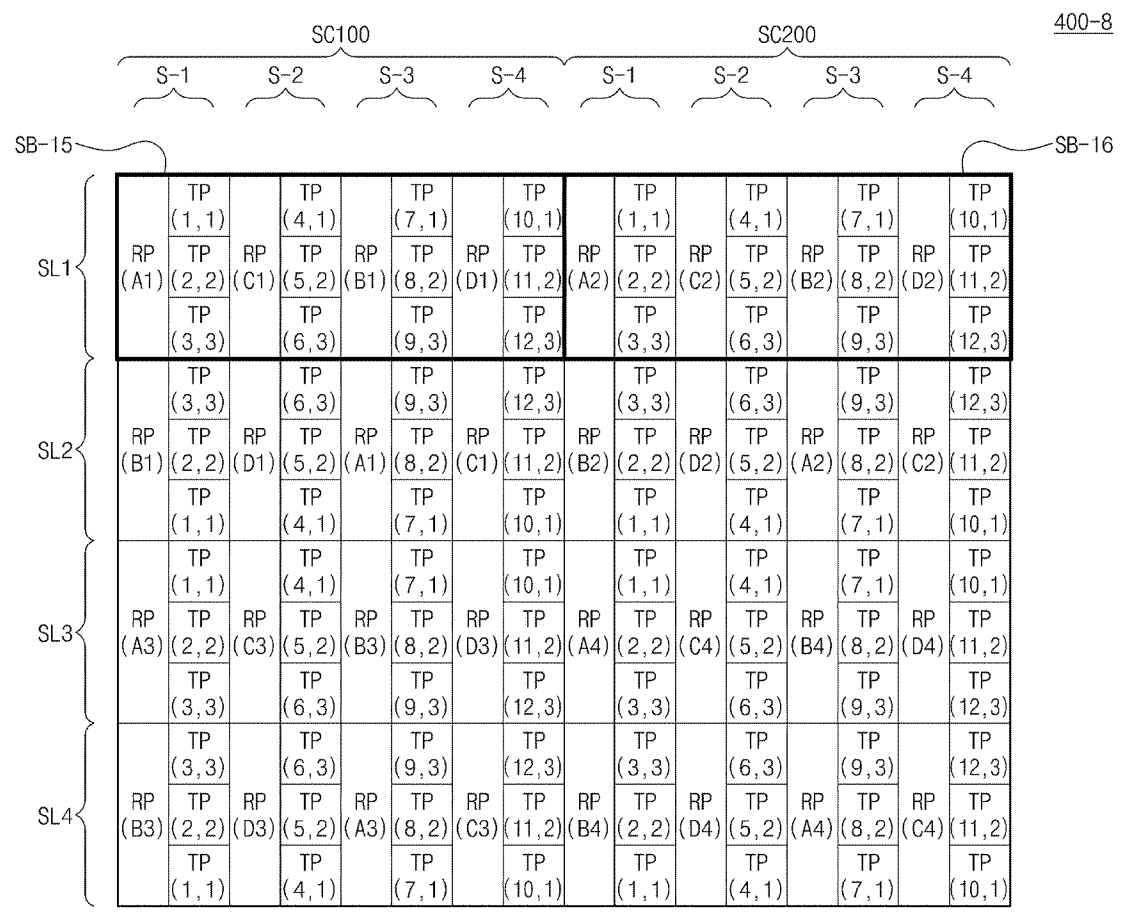

In relation to the touch screen 400-8 shown in FIG. 14, each of the sensor columns SC100 and SC200 includes four sub-columns S-1 to S-4. Each of the sensor blocks SB-15 and SB-16 includes four first sensors RP. Each of the sensor blocks SB-15 and SB-16 includes first sensors that are electrically insulated from each other. When the connection relationship of the connection lines SL-F1 to SL-F8 shown in FIG. 5D is changed as described with reference to FIGS. 11B and 12B, electrically insulated first sensors may be disposed in one sensor block.

FIGS. 15A, 15B, 16A, and 16B are plan views of a touch screen, according to one or more exemplary embodiments. The touch screens 400-9 and 400-10 will be described with reference to FIGS. 15A, 15B, 16A, and 16B; however, detailed description for a configuration similar to the configuration described with reference to FIGS. 1, 2, 3, 4, 5A, 5B, 5C, 5D, 5E, 5F, 6A, 6B, 6C, 7, 8, 9, 10, 11A, 11B, 12A, 12B, 13A, 13B, and 14 will be omitted to avoid obscuring exemplary embodiments described herein.

Figure 15B:
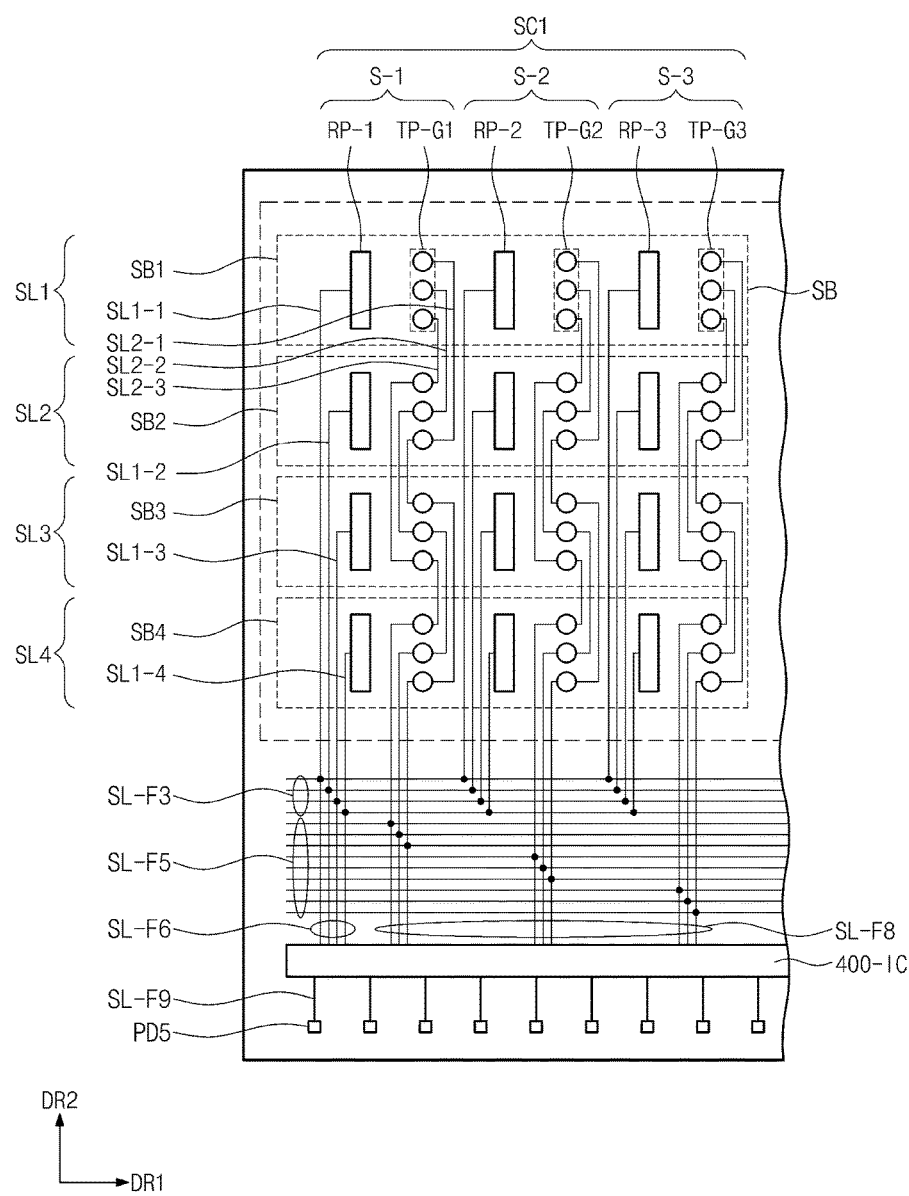

As shown in FIGS. 15A and 15B, a driver IC 400-IC may be mounted on the non-display region NDR of the touch screen 400-9. The touch screen 400-9 may have a different layer structure according to a display region DR and a non-display region NDR. For example, a single layer conductive layer may be disposed in the display region DR and multi-layered conductive layers and multi-layered insulation layers may be disposed in the non-display region.

Since the first signal lines SL1-1 to SL1-4 and the second signal lines SL2-1 to SL2-3, which are disposed in the display area DR, do not intersect each other, this may be formed of a conductive layer of a single layer. A plurality of signal lines may be formed by patterning a conductive layer of a single layer through a photolithography process.

The first signal line groups SL-F1, the second signal line groups SL-F2, the third signal line group SL-F3, the fourth signal line group SL-F4, the fifth signal line group SL-F5, the sixth signal line group SL-F6, the seventh signal line group SL-F7, the eighth signal line group SL-F8, and the ninth signal line group SL-F9 described with reference to FIG. 5D, may be disposed in the non-display region NDR. Since the first signal lines SL1-1 to SL1-4 and the second signal lines SL2-1 to SL2-3 are directly connected to the third signal line group SL-F3 and the fifth signal line group SL-F5, the first signal lines SL1-1 to SL1-4 and the second signal lines SL2-1 to SL2-3 are omitted. The fourth signal line group SL-F4 and the seventh signal line group SL-F7 relating to the second sensor column SC2 are not shown in FIG. 15B.

The second flexible circuit board 400-F10 may include pads connected to the fifth pads PD5 (see FIG. 5D) and signal lines connected to the pads. The second flexible circuit board 400-F10 may be connected to another circuit board or an electronic component, such as a connector.

Figure 16A:
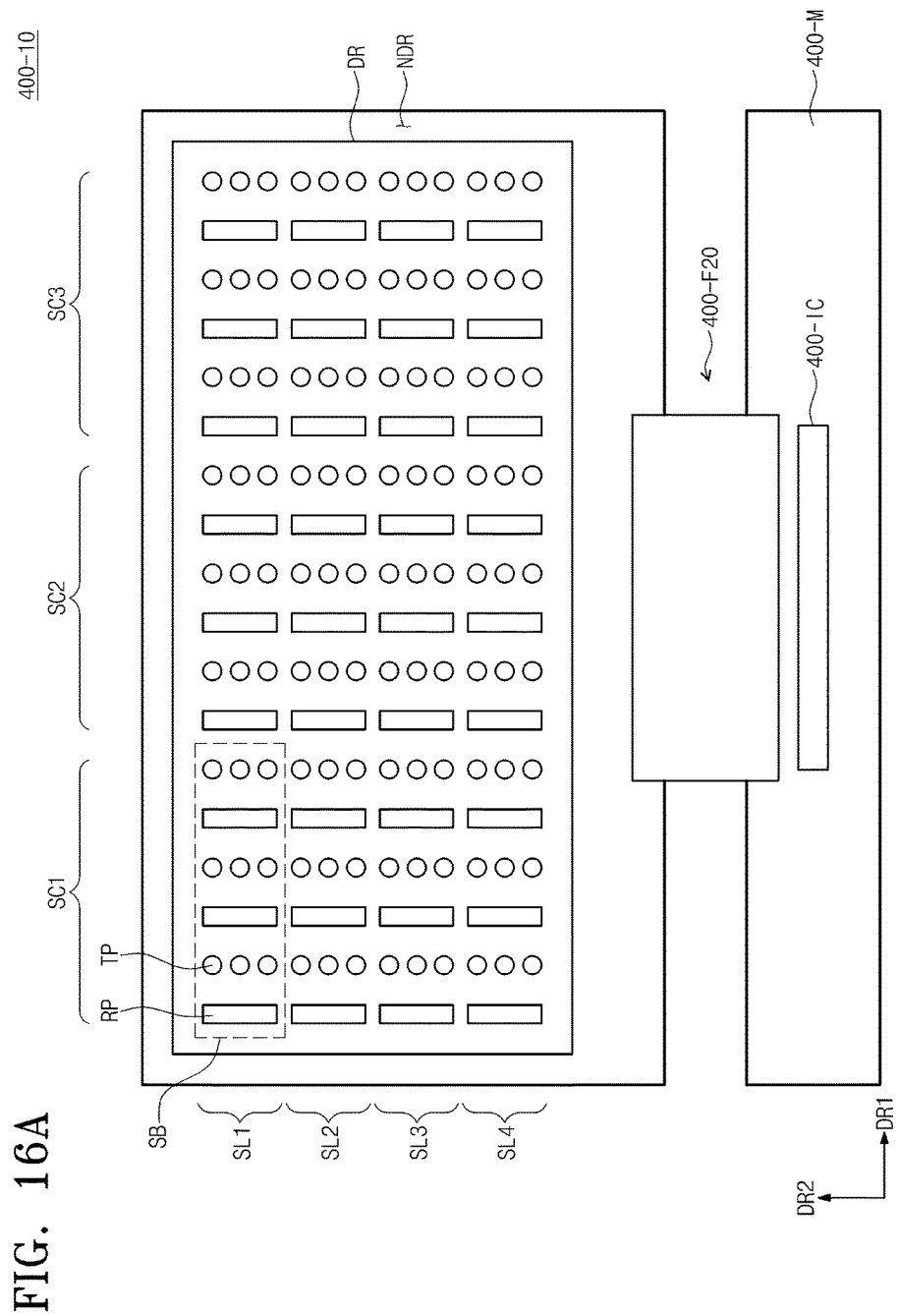
Figure 16B:
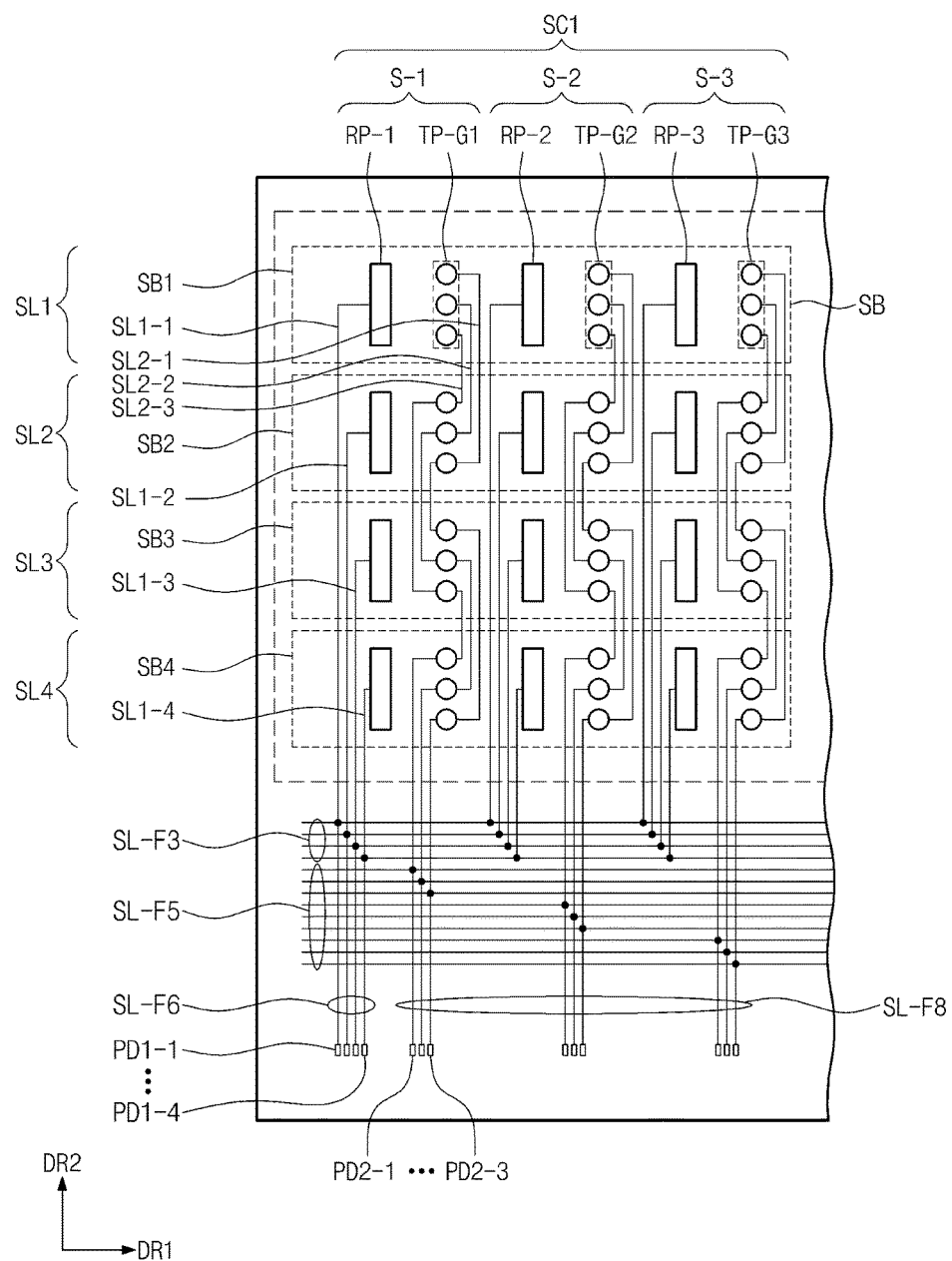

As shown in FIGS. 16A and 16B, the driver IC 400-IC may be disposed on another circuit board 400-M. A touch screen 400-9 may be substantially identical to the touch screen 400 shown in FIGS. 15A and 15B. The third signal line group SL-F3, the fourth signal line group SL-F4, the fifth signal line group SL-F5, the sixth signal line group SL-F6, the seventh signal line group SL-F7, and the eighth signal line group SL-F8, described with reference to FIG. 5D, may be disposed in the non display area NDR. The fourth signal line group SL-F4 and the seventh signal line group SL-F7 relating to the second sensor column SC2 are not shown in FIG. 16B. Pads are disposed at the ends of the sixth signal line group SL-F6 and the eighth signal line group SL-F8.

The second flexible circuit board 400-F20 may include connection lines for connecting signal lines disposed in the circuit board 400-M with the sixth signal line group SL-F6 and the eighth signal line group SL-F8.

According to one or more exemplary embodiments, the touch screen 400-10 may be substantially identical to the touch screen 400 described with reference to FIGS. 5A, 5B, 5C, and 5D. The first signal line group SL-F1, the second signal line group SL-F2, the third signal line group SL-F3, the fourth signal line group SL-F4, the fifth signal line group SL-F5, the sixth signal line group SL-F6, the seventh signal line group SL-F7, and the eighth signal line group SL-F8, which are described with reference to FIG. 5D, may be disposed in the second flexible circuit board 400-F20. The second flexible circuit board 400-F20 may connect the first pads PD1-1 to PD1-4 of the touch screen 400 with signal lines disposed in the circuit board 400-M.

Figure 17:
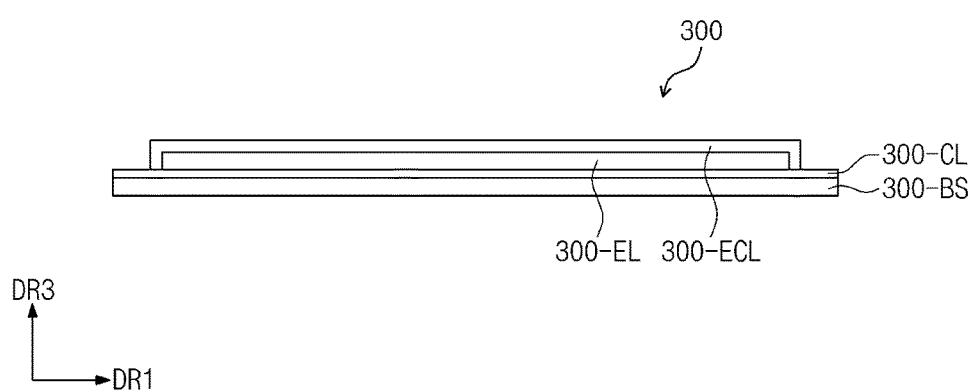
FIG. 17 is an enlarged sectional view of a display panel, according to one or more exemplary embodiments.
Figure 18:
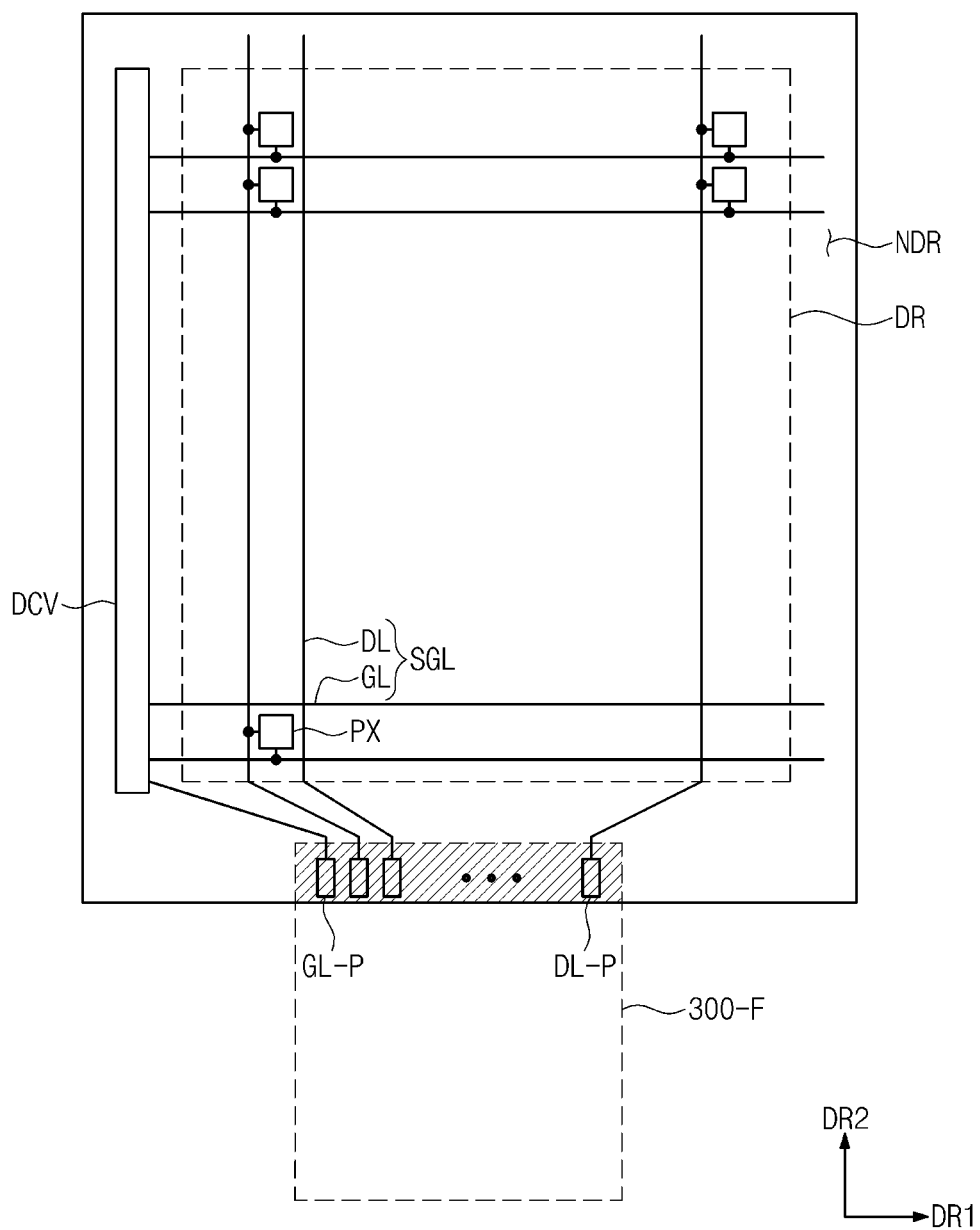
FIG. 18 is a plan view of a display panel, according to one or more exemplary embodiments.
Figure 19:
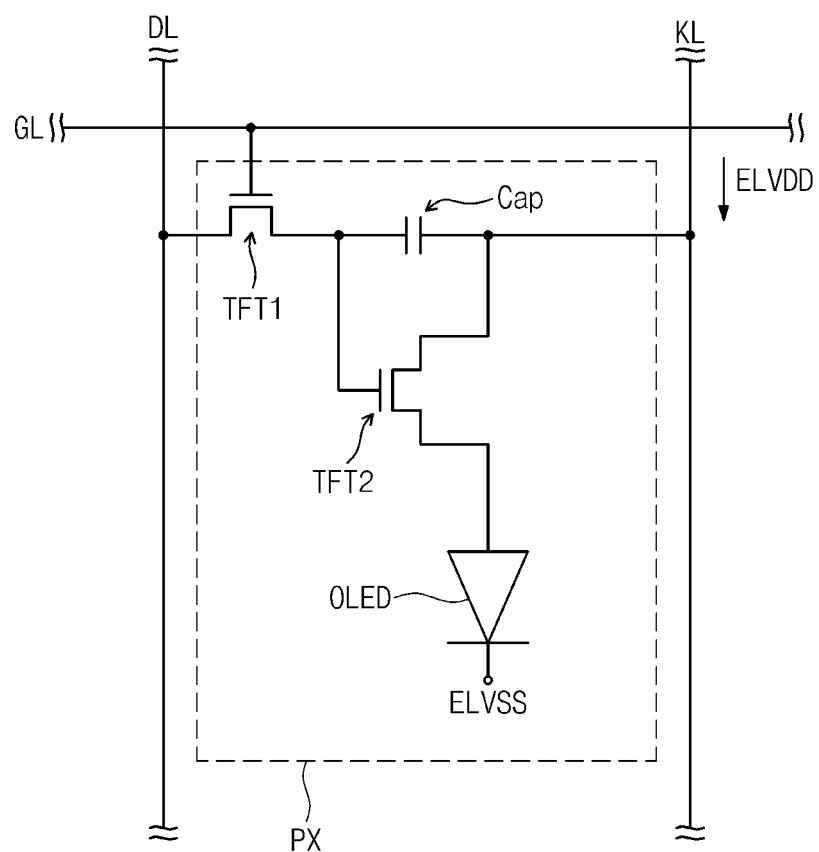
FIG. 19 is an equivalent circuit diagram of a pixel, according to one or more exemplary embodiments.

FIG. 17 is an enlarged sectional view of a display panel 300, according to one or more exemplary embodiments. FIG. 18 is a plan view of the display panel 300, according to one or more exemplary embodiments. FIG. 19 is an equivalent circuit diagram of a pixel PX, according to one or more exemplary embodiments. Hereinafter, the display panel 300 will be described with reference to FIGS. 17, 18, and 19; however, detailed description for a configuration similar to a configuration described with reference to FIGS. 1, 2, 3, 4, 5A, 5B, 5C, 5D, 5E, 5F, 6A, 6B, 6C, 7, 8, 9, 10, 11A, 11B, 12A, 12B, 13A, 13B, 14, 15A, 15B, 16A, and 16B will be omitted to avoid obscuring exemplary embodiments described herein.

As shown in FIG. 17, the display panel 300 includes a base member 300-BS, a circuit layer 300-CL, a device layer 300-EL, and a sealing layer 300-ECL. Although not shown separately, the display panel 300 may further include an optical member, for example, a phase delay plate and a polarization plate, disposed on the sealing layer 300-ECL.

The base member 300-BS may include at least one plastic film. The base member 300-BS may include two plastic films and inorganic layers, silicon nitride layers, and/or silicon oxide layers therebetween. The base member 300-BS may include at least one of polyimide (PI), polyethyleneterephthalate (PET), polyethylenenaphthalate (PEN), polyethersulphone (PES), and fiber reinforced plastics (FRP).

The circuit layer 300-CL includes a plurality of signal lines SGL and electronic devices equipped in the display panel 300. Additionally, the circuit layer 300-CL includes a plurality of insulation layers (not shown) for insulating the signal lines SGL from the electronic devices.

As shown in FIGS. 18 and 19, the circuit layer 300-CL may include a plurality of signal lines SGL. The plurality of signal lines SGL include gate lines GL arranged along the second direction axis DR2 and data lines DL arranged along the first direction axis DR1. Each of the gate lines GL and the data lines DL is connected to a corresponding pixel PX among a plurality of pixels PX. The circuit layer 300-CL may include circuits of a pixel PX, for example, at least one thin film transistor TFT1 and TFT2 and at least one capacitor Cap. The circuit layer 300-CL may further include a gate driving circuit DCV disposed at a first side of a non-display region NDR of the display panel 300. The gate lines GL and the data lines DL may include a gate pad part GL-P and data pad parts DL-P disposed in the non-display region NDR. The first flexible circuit board 300-F may be connected to the gate pad part GL-P and the data pad parts DL-P. The display panel 300 may be connected to a main driving circuit (not shown) through the first flexible circuit board 300-F.

The device layer 300-EL includes display devices. As shown in FIGS. 18 and 19, the device layer 300-EL includes an organic light emitting diode OLED of a pixel PX. The device layer 300-EL may further include electronic devices for assisting the OLED.

The sealing layer 300-ECL seals the device layer 300-EL. The device layer 300-EL includes a thin film encapsulation layer, that is, a plurality of inorganic thin layers and a plurality of organic thin layers. According to one or more exemplary embodiments, the sealing layer 300-ECL may be replaced with a sealing board. The sealing board may be spaced apart from the base member 300-BS with the device layer 300-EL therebetween. Sealant may fill a space along the frames of the sealing board and the base member 300-BS.

The base member 400-BS (see FIG. 4) of the touch screen 400 is disposed on the sealing layer 300-ECL or the sealing board. According to one or more exemplary embodiments, the conductive layer 400-CL (see FIG. 4) of the touch screen 400 may be directly disposed on the sealing layer 300-ECL or the sealing board.

Figure 20:
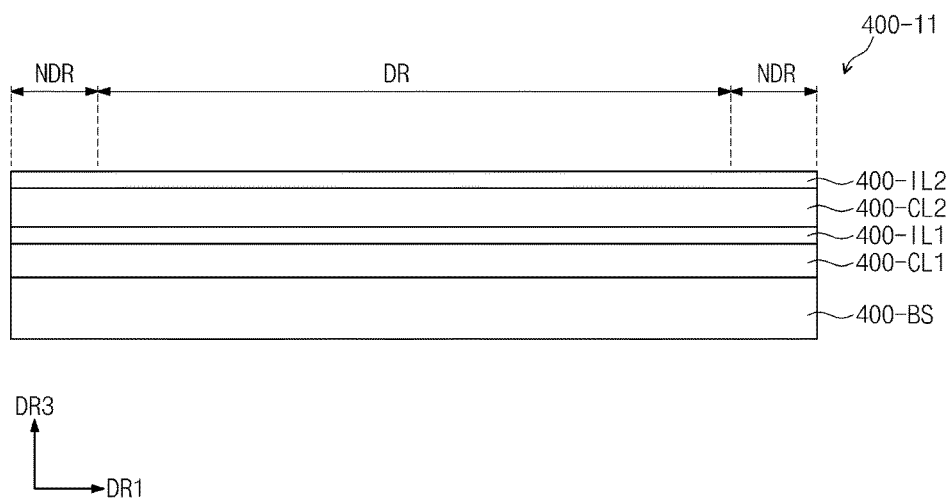
FIG. 20 is an enlarged sectional view of a touch screen, according to one or more exemplary embodiments.
Figure 21:
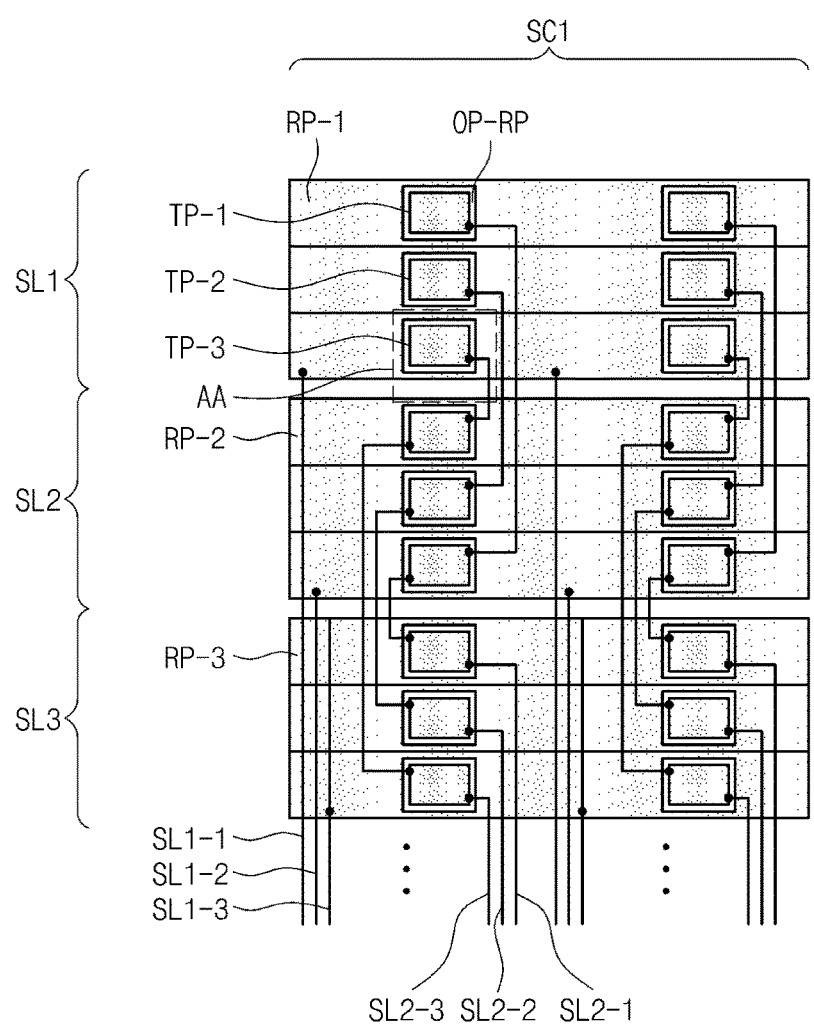
FIG. 21 is an enlarged plan view of a sensor column, according to one or more exemplary embodiments.
Figure 22A:
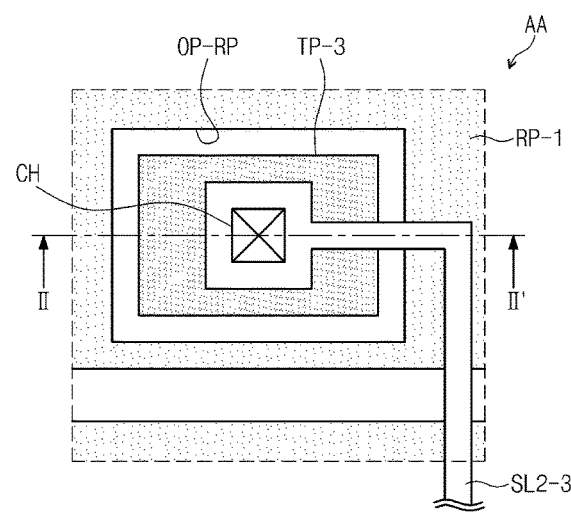
FIG. 22A is an enlarged plan view of portion AA of the sensor column of FIG. 21, according to one or more exemplary embodiments.
Figure 22B:
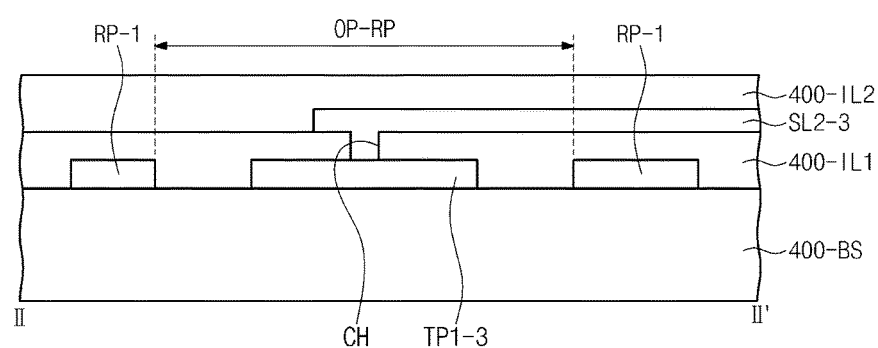
FIG. 22B is a sectional view of the sensor column of FIG. 22A taken along sectional line II-II', according to one or more exemplary embodiments.
Figure 23A:
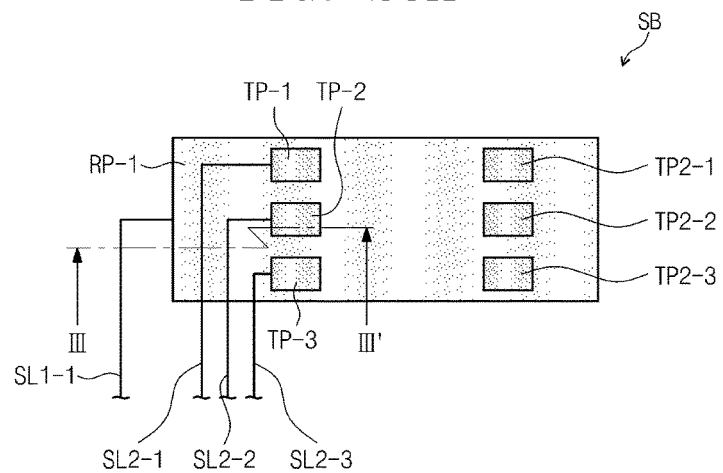
FIG. 23A is an enlarged plan view of a sensor block, according to one or more exemplary embodiments.
Figure 23B:
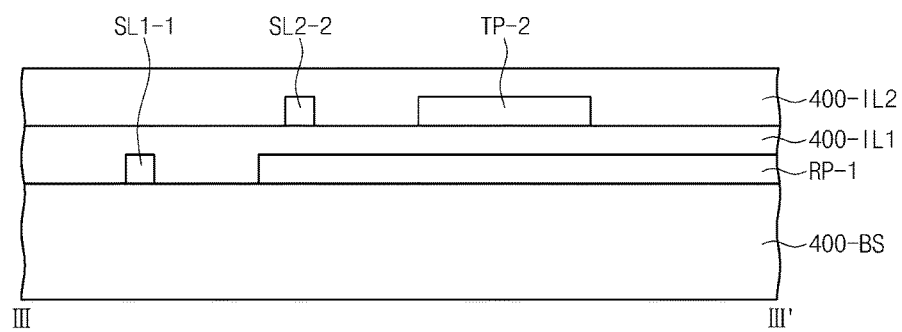
FIG. 23B is a sectional view of the sensor block of FIG. 23A taken along sectional line III-III', according to one or more exemplary embodiments.

FIG. 20 is an enlarged sectional view of a touch screen 400-5, according to one or more exemplary embodiments. FIG. 21 is an enlarged plan view of a sensor column SC1, according to one or more exemplary embodiments. FIG. 22A is an enlarged plan view of a portion AA of the sensor column SC1 of FIG. 21, whereas FIG. 22B is a sectional view of the sensor column SC1 taken along sectional line II-II' of FIG. 22A. FIG. 23A is an enlarged plan view of a sensor block SB, according to one or more exemplary embodiments. FIG. 23B is a sectional view of the sensor block of FIG. 23A taken along sectional line III-III', according to one or more exemplary embodiments. The touch screen 400-11 will be described with reference to FIGS. 20, 21, 22A, 22B, 23A, and 23B, but detailed description for a configuration similar to a configuration described with reference to FIGS. 1, 2, 3, 4, 5A, 5B, 5C, 5D, 5E, 5F, 6A, 6B, 6C, 7, 8, 9, 10, 11A, 11B, 12A, 12B, 13A, 13B, 14, 15A, 15B, 16A, 16B, 17, 18, and 19 will be omitted to avoid obscuring exemplary embodiments described herein.

Referring to FIG. 20, the touch screen 400-11 includes a base member 400-BS, a first conductive layer 400-CL1, a first insulation layer 400-IL1, a second conductive layer 400-CL2, and a second insulation layer 400-IL2. Each of the first and second conductive layers 400-CL1 and 400-CL2 may be substantially identical to the conductive layer 400-CL described with reference to FIG. 4 and, therefore, a detailed description is omitted. The first conductive layer 400-CL1 may include two groups among the plurality of first sensors RP, the plurality of second sensors TP, the plurality of first signal lines SL1-1 to SL1-4, and the plurality of second signal lines SL2-1 to SL2-3 described with reference to FIGS. 5A to 5D, and the second conductive layer 400-CL2 may include the other two groups among the plurality of first sensors RP, the plurality of second sensors TP, the plurality of first signal lines SL1-1 to SL1-4, and the plurality of second signal lines SL2-1 to SL2-3 described with reference to FIGS. 5A to 5D.

Referring to FIG. 21, a portion of the first sensor column SC1 is exemplarily illustrated. As shown in FIG. 21, the first conductive layer 400-CL1 may include a plurality of first sensors RP-1, RP-2, and RP-3 and a plurality of second sensors TP-1, TP-2, and TP-3 disposed at each of the sensor rows SL1, SL2, and SL3. The plurality of first sensors RP-1, RP-2, and RP-3 may include a plurality of opening parts OP-RP. The second sensors TP-1, TP-2, and TP-3 are respectively disposed in the opening parts OP-RP.

The second conductive layer 400-CL2 may include a plurality of first signal lines SL1-1, SL1-2, and SL1-3 and a plurality of second signal lines SL2-1 to SL2-3. The plurality of first signal lines SL1-1, SL1-2, and SL1-3 are respectively connected to the plurality of first sensors RP-1, RP-2, and RP-3. Each of the plurality of second signal lines SL2-1 to SL2-3 connects corresponding second sensors of the sensor rows SL1, SL2, and SL3.

As shown in FIGS. 22A and 22B, the first sensor RP-1 and the second sensor TP-3 are disposed on a first surface of the base member 400-BS. A first insulation layer 400-IL1 covering the first sensor RP-1 and the second sensor TP-3 is disposed on the first surface of the base member 400-BS. A second signal line SL2-1 is disposed on a first surface of the first insulation layer 400-IL1. The second signal line SL2-1 is connected to the second sensor TP-3 through a contact hole CH penetrating the first insulation layer 400-IL1. A second insulation layer 400-IL2 covering the second signal line SL2-1 is disposed on a first surface of the first insulation layer 400-IL1.

FIGS. 23A and 23B respective illustrate a plan view and a sectional view of a sensor block SB, according to one or more exemplary embodiments. A first conductive layer 400-CL1 may include a first sensor RP-1 and a first signal line SL1-1. A second conductive layer 400-CL2 may include second sensors TP-1, TP-2, and TP-3 and second signal lines SL2-1, SL2-2, and SL2-3.

As shown in FIG. 23B, the first sensor RP-1 and the first signal line SL1-1 are disposed on a first surface of the base member 400-BS. A first insulation layer 400-IL1 covering the first sensor RP-1 and the signal line SL1-1 is disposed on the first surface of the base member 400-BS. The second sensor TP-2 and the second signal line SL2-2 are disposed on a first surface of the first insulation layer 400-IL1. A second insulation layer 400-IL2 covering the second sensor TP-2 and the second signal line SL2-2 are disposed on a first surface of the first insulation layer 400-IL1. Unlike as shown in FIGS. 21, 22A, and 22B, a touch screen according to FIGS. 23A and 23B may omit a contact hole CH.

According to one or more exemplary embodiments, because a second sensor of a first sensor block and second sensors of a second sensor block arranged along a second direction axis are electrically connected together, the number of signal lines may be reduced. As the number of signal lines is reduced, an interval between first sensors is reduced. In this manner, touch sensitivity may be improved. Furthermore, as a plurality of first sensors may be electrically connected together, the number of pads in a driving circuit may be reduced. To this end, as a plurality of second sensors in a first sensor block and some of a plurality of second sensors in a second sensor block may be electrically connected to each other, the number of pads in a driving circuit may be reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A display device, comprising:
  a display panel configured to generate an image; and
  a touch screen disposed on the display panel, the touch screen comprising sensor blocks and signal lines,
  wherein each of the sensor blocks comprises:
    k (k being a natural number of two or more) first sensors arranged along a first direction and electrically connected to each other; and
    j (j being a natural number of two or more) sensor groups, each of the j sensor groups disposed adjacent to a corresponding first sensor among the k first sensors and comprising i (i being a natural number of three or more) second sensors arranged along a second direction intersecting the first direction,
  wherein some of the k first sensors and the i second sensors are configured to receive first signals, wherein some of the k first sensors and the i second sensors are configured to transmit second signals different from the first signals, and wherein:
the sensor blocks comprise a first sensor block and a second sensor block arranged along the second direction; and
for each m, a corresponding signal line among the signal lines electrically connects an m-th (m being a natural number of one or more and less than i) second sensor among the i second sensors of an n-th (n being a natural number of one or more and less than j) sensor group among the j sensor groups of the first sensor block directly to an i−m+1-th second sensor among the i second sensors of the n-th sensor group among the j sensor groups of the second sensor block.

2. The display device of claim 1, wherein the touch screen further comprises:
first signal lines respectively connected to the k first sensors of the first sensor block; and
second signal lines respectively connected to the k first sensors of the second sensor block.

3. The display device of claim 2, wherein the touch screen further comprises:
a first connection line connecting the first signal lines to each other; and
a second connection line connecting the second signal lines to each other.

4. The display device of claim 2, wherein the touch screen further comprises:
a third signal line electrically connecting the m-th second sensor of the n-th sensor group of the first sensor block with the i−m+1-th second sensor of the n-th sensor group of the second sensor block.

5. The display device of claim 4, further comprising:
a flexible circuit board,
wherein the touch screen further comprises:
first pads respectively connected to first ends of the first signal lines; and
second pads respectively connected to second ends of the second signal lines, and
wherein the flexible circuit board comprises:
third pads respectively connected to the first pads;
fourth pads respectively connected to the second pads.

6. The display device of claim 5, further comprising:
a driving circuit disposed on the flexible circuit board and electrically connected to the third pads and the fourth pads.

7. The display device of claim 6, wherein the flexible circuit board further comprises:
first connection lines respectively connected to the third pads;
a second connection line connecting the first connection lines to each other;
a third connection line connecting the second connection line with the driving circuit;
fourth connection lines connected to the fourth pads;
a fifth connection line connecting the fourth connection lines to each other; and
a sixth connection line connecting the fifth connection line with the driving circuit.

8. The display device of claim 6, wherein the driving circuit comprises:
a scan driving circuit configured to provide the first signals; and a touch detection circuit configured to calculate coordinate information of a point input from the second signals.

9. The display device of claim 8, wherein the first signals comprise different information from each other.

10. The display device of claim 8, wherein the second signals comprise:
capacitive coupling information between one first sensor among the k first sensors and one second sensor among the i second sensors of a sensor group disposed adjacent to the one first sensor among the j sensor groups.

11. The display device of claim 4, wherein the k first sensors, the i second sensors of the j sensor groups, the first signal lines, the second signal lines, and the third signal line are disposed in the same layer as one another.

12. The display device of claim 4, wherein the touch screen further comprises:
a base member; and
an insulating layer disposed on the base member,
wherein two groups among the k first sensors, the i second sensors of the j sensor groups, the first signal lines, and the third signal line are disposed on a first surface of the base member and the other two groups among the k first sensors, the i second sensors of the j sensor groups, the first signal lines, and the third signal line are disposed on a second surface of the insulating layer.

13. The display device of claim 1, wherein:
the sensor blocks comprise a third sensor block arranged along the first direction from the first sensor block;
the k first sensors of the first sensor block are electrically connected to each other and the k first sensors of the third sensor block are electrically connected to each other; and
the k first sensors of the first sensor block and the k first sensors of the third sensor block are electrically insulated from each other.

14. The display device of claim 13, wherein an m-th (m being natural number of one or more and less than i) second sensor among the i second sensors of a n-th (n being a natural number of one or more and less than j) sensor group among the j sensor groups of the first sensor block and the m-th second sensor among the i second sensors of the n-th sensor group among the j sensor groups of the third sensor block are electrically connected to each other.

15. The display device of claim 14, wherein the touch screen further comprises:
a first signal line connected to the m-th second sensor among the i second sensors of the n-th sensor group among the j sensor groups of the first sensor block; and
a second signal line connected to the m-th second sensor among the i second sensors of the n-th sensor group among the j sensor groups of the third sensor block.

16. The display device of claim 15, further comprising:
a flexible circuit board,
wherein the touch screen further comprises:
a first pad connected to the first signal line; and
a second pad connected to the second signal line, and
wherein the flexible circuit board comprises:
a third pad connected to the first pad; and
a fourth pad connected to the second pad.

17. The display device of claim 16, wherein the flexible circuit board further comprises:
a first connection line connected to the third pad;
a second signal line connected to the fourth pad; and
a third signal line connecting the first signal line and the second signal line.

18. The display device of claim 13, wherein the sensor blocks further comprise:
a fourth sensor block disposed adjacent to the second sensor block along the first direction.

19. The display device of claim 18, wherein:
an m-th (m being a natural number of one or more and less than i) second sensor among the i second sensors of a n-th (n being a natural number of one or more and less than j) sensor group among the j sensor groups of the first sensor block and the m-th second sensor among the i second sensors of the n-th sensor group among the j sensor groups of the third sensor block are electrically connected to each other; and
the i second sensors of a j-th sensor group among the j sensor groups of the first sensor block and the i second sensors of a j-th sensor group among the j sensor groups of the third sensor block are electrically insulated from each other.

20. The display device of claim 19, wherein the i second sensors of the j-th sensor group of the first sensor block and the i second sensors of the j-th sensor group of the third sensor block receive different first signals from each other.

21. The display device of claim 19 wherein the m-th second sensor among the i second sensors of the n-th sensor group among the j sensor groups of the first sensor block and the m-th second sensor among the i second sensors of the n-th sensor group among the j sensor groups of the fourth sensor block are electrically connected to each other.

22. The display device of claim 1, wherein the k first sensors and the j sensor groups are in one-to-one correspondence.

23. The display device of claim 1, wherein the k first sensors and the i second sensors have a mesh structure.

24. The display device of claim 1, wherein the touch sensor screen further comprises signal lines connected to the sensor blocks, the signal lines having a mesh structure.

25. A display device, comprising:
a display panel configured to generate an image; and
a touch screen disposed on the display panel and comprising sensor blocks,
wherein each of the sensor blocks comprises:
k (k being a natural number of three or more) first sensors arranged along a first direction, the k first sensors being arranged in a single line, a first part of the k first sensors being electrically connected to each other, a remaining part of the k first sensors being electrically connected to each other and being electrically insulated from the first part of the k first sensors; and
sensor groups disposed adjacent to a corresponding sensor among the k first sensors, each of the sensor groups comprising i (i being a natural number of two or more) second sensors arranged along a second direction intersecting the first direction,
wherein the k first sensors are configured to transmit first signals, and
wherein the sensor groups are configured to receive second signals.

26. The display device of claim 25, wherein:
the first part of the k first sensors define a first type of sensors;
the remaining part of the k first sensors define a second type of sensors different than the first type of sensors; and
the first type of sensors and the second type of sensors are alternately disposed along the first direction.

27. A touch screen comprising:
signal lines; and
sensor blocks,
wherein each of the sensor blocks comprises:
k (k being a natural number of two or more) first sensors arranged along a first direction and electrically connected to each other; and
j (j being a natural number of two or more) sensor groups disposed adjacent to a corresponding first sensor of the k first sensors, each of the j sensor groups comprising i (i being a natural number of three or more) second sensors arranged along a second direction intersecting the first direction,
wherein some of the k first sensors and the i second sensors are configured to receive first signals,
wherein some of the k first sensors and the i second sensors are configured to transmit second signals, and
wherein:
the sensor blocks comprise a first sensor block and a second sensor block arranged along the second direction; and
for each m, a corresponding signal line among the signal lines electrically connects an m-th (m being a natural number of one or more and less than i) second sensor among the i second sensors of an n-th (n being a natural number of one or more and less than j) sensor group among the j sensor groups of the first sensor block directly to an i−m+1-th second sensor among the i second sensors of the n-th sensor group among the j sensor groups of the second sensor block.

* * * * *